United States Patent
Noguchi et al.

(10) Patent No.: US 6,677,036 B2
(45) Date of Patent: Jan. 13, 2004

(54) METHOD FOR PRODUCING MAGNETIC RECORDING MEDIUM AND MAGNETIC RECORDING MEDIUM

(75) Inventors: Hitoshi Noguchi, Odawara (JP); Nobuo Yamazaki, Odawara (JP); Shinji Saito, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 17 days.

(21) Appl. No.: 10/281,996

(22) Filed: Oct. 29, 2002

(65) Prior Publication Data

US 2003/0143323 A1 Jul. 31, 2003

(30) Foreign Application Priority Data

Oct. 29, 2001 (JP) ..................................... P. 2001-330575

(51) Int. Cl.⁷ .................................................. B05D 5/12
(52) U.S. Cl. ................. 428/332; 427/128; 428/694 BY; 428/694 BL; 428/694 BH; 428/900
(58) Field of Search .......................... 428/332, 694 BY, 428/694 BL, 694 BH, 900; 427/128

(56) References Cited

FOREIGN PATENT DOCUMENTS

JP 2000-173038 6/2000

Primary Examiner—Bernard Pianalto

(57) ABSTRACT

A method for producing a magnetic recording medium comprising: dispersing at least a binder and a ferromagnetic hexagonal ferrite powder to prepare a magnetic coating; and applying the magnetic coating to provide at least one magnetic layer, wherein the binder is at least one of: (a) a binder comprising 0.2 to 0.7 meq/g of at least one polar group selected from $-SO_3M$, $-OSO_3M$, $-PO(OM)_2$, $-OPO(OM)_2$ and $-COOM$ wherein M represents a hydrogen atom, an alkali metal or ammonium; and (b) a binder comprising 0.5 to 5 meq/g of at least one polar group selected from $-CONR_1R_2$, $-NR_1R_2$ and $-N^+R_1R_2R_3$ wherein $R_1$, $R_2$ and $R_3$ each independently represents a hydrogen atom or an alkyl group, and the ferromagnetic hexagonal ferrite powder has an average tabular diameter of from 10 to 40 nm and a water content of from 0.3 to 3% by weight.

13 Claims, No Drawings

METHOD FOR PRODUCING MAGNETIC RECORDING MEDIUM AND MAGNETIC RECORDING MEDIUM

FIELD OF THE INVENTION

The present invention relates to a method for producing a magnetic recording medium, and to the magnetic recording medium. In particular, the invention relates to a method for producing a magnetic recording medium for high-density recording having a thin-layer magnetic layer, and to the magnetic recording medium obtained by that method.

BACKGROUND OF THE INVENTION

Magnetic recording media each comprising a non-magnetic support having provided thereon a magnetic layer in which a ferromagnetic powder is dispersed in a binder have been widely used as magnetic recording media such as (disks and tapes) for computers. In recent years, in magnetic recording field, practical application has advanced from the conventional analog recording to the digital recording in which recording is less deteriorated. However, the digital recording generally requires recording of many signals, compared to the analog recording. Moreover, read-write apparatus and recording media used are required to be miniaturized and decreased in space occupied thereby, as well as they are required to have high image quality and high sound quality. Accordingly, higher density recording is required.

In order to achieve high-density recording, recording signals are shortened in their wavelength and recording tracks are narrowed, so that the recording media are required to be more improved in electromagnetic characteristics. In order to improve the electromagnetic characteristics, various methods such as improvements in magnetic characteristics of the ferromagnetic powders, reductions of the powders to fine particles, high filling of the powders and ultra smoothing of surfaces of the media have been proposed. However, these techniques have not been sufficient to recent increases in recording density.

On the other hand, when the recording wavelength is further shortened, an increase in the thickness of a magnetic layer makes larger the problems of self-demagnetization loss in recording and thickness loss in reproduction. Further,in order to avoid saturation of a reproducing head, the thickness of a magnetic layer has been decreased. However, when the magnetic layer is thinned to about 0.1 $\mu$m or less, the influence of a non-magnetic support becomes easy to appear on a surface of the magnetic layer, and the tendency of the electromagnetic characteristics to deteriorate and the tendency of the error rate to increase are observed.

In order to reduce noise, it is important to decrease the size of magnetic substances, and ferromagnetic metal powders having a length in the long axis of 80 $\mu$m or less or fine ferromagnetic hexagonal ferrite powders having a tabular diameter (plate size) of 40 nm or less have been used. However, such fine granular ferromagnetic powders easily aggregate, so that it has been very difficult to obtain good dispersibility, compared to relatively large ferromagnetic powders which have hitherto been used. Further, when the dispersibility of the ferromagnetic powders is poor, the ferromagnetic powders aggregate to be liable to form minute projections on surfaces of the magnetic layers. The use of an MR head has also raised the problem of thermal asperity caused by these minute projections.

SUMMARY OF THE INVENTION

An object of the invention is to provide a method for producing a magnetic recording medium excellent in electromagnetic characteristics, suppressed in the occurrence of thermal asperity and suitable for high-density recording, and the magnetic recording medium.

The object of the invention is attained by a method for producing a magnetic recording medium of the following constitution:

1. In a method for producing a magnetic recording medium comprising providing at least one magnetic layer by applying a magnetic coating obtained by dispersing at least a binder and a ferromagnetic hexagonal ferrite powder, the method is characterized in that the binder is at least either of
   (a) a binder containing 0.2 to 0.7 meq/g of at least one polar group selected from —SO$_3$M, —OSO$_3$M, —PO(OM)$_2$, —OPO(OM)$_2$ and —COOM (wherein M represents a hydrogen atom, an alkali metal or ammonium) and
   (b) a binder containing 0.5 to 5 meq/g of at least one polar group selected from —CONR$_1$R$_2$, —NR$_1$R$_2$ and —N$^+$R$_1$R$_2$R$_3$ (wherein R$_1$, R$_2$ and R$_3$ each independently represents a hydrogen atom or an alkyl group), and in that
   the ferromagnetic hexagonal ferrite powder subjected to the dispersion has an average tabular diameter of from 10 to 40 nm and a water content of from 0.3 to 3% by weight.

As the method f or producing the magnetic recording medium or the magnetic recording medium of the invention, preferred embodiments are described below:

2. The method for producing the magnetic recording medium described in the above (1), which is characterized in that the binder is a polyurethane (A) obtained by reacting a polyol having a cyclic structure and an alkylene oxide chain and having a molecular weight of from 500 to 5000, and a polyol having a cyclic structure and having a molecular weight of from 200 to 500 as a chain extender, with an organic diisocyanate;

3. The method for producing the magnetic recording medium described in the above (1), which is characterized in that the binder is a polyurethane (B) obtained by reacting a polyester polyol comprising an aliphatic dibasic acid and an aliphatic diol having an alkyl branched side chain and no cyclic structure, and an aliphatic diol having a branched alkyl side chain and 3 or more carbon atoms as a chain extender, with an organic diisocyanate;

4. The method for producing the magnetic recording medium described in the above (1), which is characterized in that the binder is a polyurethane (C) obtained by reacting a polyol compound having a cyclic structure and an alkyl group of 2 or more carbon atoms with an organic diisocyanate;

5. The method for producing the magnetic recording medium described in the above (1), which is characterized in that the binder is a vinyl chloride-based copolymer containing at least 75% by weight to 95% by weight of vinyl chloride monomer units;

6. The method for producing the magnetic recording medium described in the above (1), which is characterized in that the binder is an acrylic copolymer comprising 1% by weight to 75% by weight of nitrogen-containing radically polymerizable monomer units, 1% by weight to 75% by weight of aromatic ring-containing radically polymerizable monomer units and other radically polymerizable monomer units so as to give the total amount of 100% by weight;

7. A magnetic recording medium characterized in that the magnetic recording medium is obtained by the method for producing the magnetic recording medium described in any one of the above (1) to (6); and 8. The magnetic recording medium described in the above (7), which is characterized in that the magnetic recording medium is for MR head reproduction.

Although an increase in track density is indispensable for increasing the capacity of a magnetic recording medium, it becomes necessary to employ an MR head with a decrease in track width. The MR head is high in sensitivity, but it is liable to be influenced by medium noise, and the ununiformity of the dispersed state of a magnetic substance causes a noise source. Further, in the case of the MR head, a problem is encountered with regard to the occurrence of thermal asperity, which is caused by minute projections on a surface of a magnetic layer. In the invention, the suitable selection of the water content of the magnetic substance and the amount of the hydrophilic polar group of the binder has increased the amount of the binder adsorbed by the magnetic substance, and has substantially improved the level of dispersion. Improvement in dispersibility has decreased the media noise, and has also reduced the minute projections contributing to thermal asperity, resulting in the achievement of substantial improvement in recording density in combination with the MR head.

DETAILED DESCRIPTION OF THE INVENTION

The invention is described in more detail below.

In the method for producing the magnetic recording medium of the invention, the magnetic coating obtained by dispersing at least the binder and the ferromagnetic hexagonal ferrite powder is applied onto a surface of a non-magnetic support to give a specified film thickness, thereby providing at least one magnetic layer. Here, a plurality of coating solutions for magnetic layers may be sequentially or concurrently applied in multiple layers, or a coating solution for a non-magnetic layer and a coating solution for a magnetic layer may be sequentially or concurrently applied in multiple layers Here, the magnetic coating is one obtained by dispersing at least either binder of (a) the binder containing 0.2 to 0.7 meq/g of at least one polar group selected from —$SO_3M$, —$OSO_3M$, —$PO(OM)_2$, —$OPO(OM)_2$ and —COOM (wherein M represents a hydrogen atom, an alkali metal or ammonium) and (b) the binder containing 0.5 to 5 meq/g of at least one polar group selected from —$CONR_1R_2$, —$NR_1R_2$ and —$N^+R_1R_2R_3$ (wherein $R_1$, $R_2$ and $R_3$ each independently represents a hydrogen atom or an alkyl group), and the ferromagnetic hexagonal ferrite powder having an average tabular diameter of from 10 to 40 nm and a water content of from 0.3 to 3% by weight.

The selection of the kind and amount of the hydrophilic polar group contained in the binder and the water content of the magnetic powder within the above-mentioned ranges substantially improves the dispersibility of the binder and the magnetic powder. In the magnetic recording medium in which the magnetic coating obtained by dispersing both is applied to provide the magnetic layer, the media noise is decreased, and the minute projections contributing to thermal asperity are also reduced, resulting in the achievement of substantial improvement in recording-density.

As a coater for applying the above-mentioned magnetic coating solution or coating solution for the non-magnetic layer, there can be utilized an air doctor coater, a blade coater, a rod coater, an extrusion coater, an air knife coater, a squeeze coater, an impregnating coater, a reverse roll coater, a transfer roll coater, a gravure coater, a kiss coater, a cast coater, a spray coater, a spin coater or the like. For these can, reference can be made to, for example, "The Latest Coating Techniques" published by Kabushikigaisha Gijutsu Center (May 31, 1983). In application to the magnetic recording medium of the invention, the following can be proposed as examples of the coating apparatus and methods.

(1) First, a coating solution is applied with a coater such as a gravure coater, a roll coater, a blade coater or an extrusion coater, which is generally applied in application of a coating solution for a magnetic layer, to form a lower layer, and while the lower layer is in a wet state, a coating solution is applied with a support pressure type extrusion coater as described in Japanese Patent Publication No. 46186/1989, Japanese Patent Laid-Open Nos. 238179/1985 and 265672/1990 to form an upper layer;

(2) Coating solutions are applied with one coating head having two slits through which the coating solutions pass, as described in Japanese Patent Laid-Open Nos. 88080/1988, 17971/1990 and 265672/1990, to nearly concurrently form upper and lower layers; and (3) Coating solutions are applied with an extrusion coater equipped with a backup roll as described in Japanese Patent Laid-Open No. 174965/1990 to nearly concurrently form upper and lower layers.

The thickness of the magnetic layer of the magnetic recording medium of the invention is optimized according to the saturation magnetic flux density of a head used, the head gap length and the band of a recording signal. However, it is generally from 0.01 to 0.10 µm, preferably from 0.02 to 0.08 µm, and more preferably from 0.03 to 0.08 µm. The magnetic layer may be divided into two or more layers having different magnetic characteristics, and the constitution with respect to a known multi-layered magnetic layer can be applied. In order to stably form this ultrathin magnetic layer, it is desirable to provide an inorganic powder-containing lower non-magnetic layer on a support, and to apply the coating solution thereon by a wet-on-wet system or a wet-on-dry system to form the magnetic layer. As for the coated layer of the coating solution for the magnetic layer, in the case of a magnetic tape, magnetic field orientation treatment is longitudinally conducted to a ferromagnetic powder contained in the coated layer of the coating solution for the magnetic layer by use of cobalt magnets or solenoids. In the case of a disk, sufficiently isotropic orientation is obtained in some cases, even when no orientation apparatus is used and no orientation treatment is conducted. However, a known random orientation apparatus such as an oblique alternate arrangement of cobalt magnets or application of an alternating current magnetic field with solenoids is preferably used. In the case of hexagonal ferrite, the isotropic orientation is generally liable to become three-dimensionally random in a plane and in a perpendicular direction. However, it is also possible to make it two-dimensionally random in a plane. Further, using a known method such as a method using heteropolar opposed magnets, circumferentially isotropic magnetic characteristics can also be imparted by perpendicular orientation. In particular, when high-density recording is made, the perpendicular orientation is preferred. Further, the perpendicular orientation may be conducted by use of a spin coater. It is preferred that the control of the temperature and air flow of drying air and the coating speed makes it possible to control a drying position of a coating film. The coating speed is preferably from 20 m/minute to 1000 m/minute, and the temperature of drying air is preferably 60° C. or more. It is also possible to conduct moderate predrying before entering into a magnet zone.

After dried, the coated layer can be subjected to surface smoothing treatment. For example, super calender rolls and the like can be utilized for the surface smoothing treatment. The surface smoothing treatment allows voids developed by removal of a solvent in drying to disappear, thereby improving the filling rate of the ferromagnetic powder in the magnetic layer. Accordingly, the magnetic recording medium having high electromagnetic characteristics can be obtained. As the calender treatment rolls, there can be used heat-resistant plastic rolls such as epoxy, polyimide, polyamide and polyamideimide rolls. Further, the coated layer can also be treated with metal rolls. It is preferred that the surface of the magnetic recording medium of the invention has such very excellent smoothness that the surface center line average height is within the range from 0.1 to 4 nm, and preferably from 1 to 3 nm, at a cut-off value of 0.25 mm. Such treatment is conducted by subjecting, for example, the magnetic layer formed by selecting the specific ferromagnetic powder and binder to the above-mentioned calender treatment. As for calender treatment conditions, the treatment is preferably conducted at a calender roll temperature within the range from 60 to 100° C., preferably from 70 to 100° C. and particularly preferably from 80 to 100° C., and at a pressure within the range from 100 to 500 kg/cm, preferably from 200 to 450 kg/cm and particularly preferably from 300 to 400 kg/cm. The resulting magnetic recording medium can be used after cutting to a desired size with a cutting machine or the like.

In the production of the magnetic recording medium of the invention, the particle size of the magnetic substance used in the magnetic layer is extremely small, and the binder contains the hydrophilic group in very large amounts to be optimized to the water content of the magnetic substance, which causes easy retention of adsorbed water on a surface of the magnetic substance and a trace amount of water in a solvent of the coating solution. It is therefore conceivable that the binder is liable to plastically flow even after drying of the magnetic layer to improve formability in the calender process.

Constituent elements of the magnetic recording medium obtained in the invention are described in detail below.

Binder

The binder used in at least one or more magnetic layers of the invention is at least either of (a) a binder containing 0.2 to 0.7 meq/g of at least one polar group selected from —$SO_3M$, —$OSO_3M$, —$PO(OM)_2$, —$OPO(OM)_2$ and —COOM (wherein M represents a hydrogen atom, an alkali metal or ammonium) and (b) a binder containing 0.5 to 5 meq/g of at least one polar group selected from —$CONR_1R_2$, —$NR_1R_2$ and —$N^+R_1R_2R_3$ (wherein $R_1$, $R_2$ and $R_3$ each independently represents a hydrogen atom or an alkyl group). That is to say, the above-mentioned binder (a) or (b) is used, and moreover, both. may be used together.

Here, the alkyl group is preferably an alkyl group having from 1 to 18 carbon atoms, and may have either a straight chain structure or a branched structure.

The content of the polar group of the above-mentioned binder (a) is from 0.2 to 0.7 meq/g, preferably from 0.25 to 0.6 meq/g, and more preferably from 0.3 to 0.5 meq/g.

Further, the content of the polar group of the above-mentioned binder (b) is from 0.5 to 5 meq/g, preferably from 1 to 4 meq/g, and more preferably from 1.5 to 3.5 meq/g.

When the content of the above-mentioned polar group is outside the above-mentioned range, the fine particle magnetic substance can not be dispersed well.

Polyurethane Resin

In the invention, a polyurethane resin can be used as the binder. The polyurethane resins used include, for example, (1) a polyurethane (A) obtained by reacting a polyol having a cyclic structure and an alkylene oxide chain and having a molecular weight of from 500 to 5000, and a polyol having a cyclic structure and having a molecular weight of from 200 to 500 as a chain extender, with an organic diisocyanate, and belonging to at least either of the above-mentioned binders (a) and (b);

(2) a polyurethane (B) obtained by reacting a polyester polyol comprising an aliphatic dibasic acid and an aliphatic diol having an alkyl branched side chain and no cyclic structure, and an aliphatic diol having a branched alkyl side chain of 3 or more carbon atoms as a chain extender, with an organic diisocyanate, and belonging to at least either of the above-mentioned binders (a) and (b); and (3) a polyurethane (C) obtained by reacting a polyol compound having a cyclic structure and an alkyl group of 2 or more carbon atoms with an organic diisocyanate, and belonging to at least either of the above-mentioned binders (a) and (b).

(Polyurethane Resin (A))

As the polyol having a cyclic structure and an alkylene oxide chain, which is a starting material for the polyurethane (A), there can be used one obtained by adding an alkylene oxide such as ethylene oxide or propylene oxide to a diol having a cyclic structure. Specifically, there can be used a diol such as bisphenol A, hydrogenated bisphenol A, bisphenol S, hydrogenated bisphenol S, bisphenol P, hydrogenated bisphenol P, tricyclodecanedimethanol, cyclohexanedimethanol, cyclohexanediol, 5,5'-(1-methylethylidene)bis(1,1'-bicyclohexyl)-2-ol, 4,4'-(1-methylethylidene)bis-2-methylcyclohexanol, 5,5'-(1,1'-cyclohexylidene)bis-(1,1'-bicyclohexyl)-2-ol, 5,5'-(1,1'-cyclohexylmethylene)bis-(1,1'-bicyclohexyl)-2-ol, hydrogenated terpenediphenol, di-phenylbisphenol A, diphenylbisphenol S, diphenylbisphenol P, 9,9-bis-(4-hydroxyphenyl)fluorene, 4,4'-(3-methylethylidene)bis(2-cyclohexyl-5-methylphenol), 4,4'-(3-methylethylidene)bis (2-phenyl-5-methylcyclohexanol) 4,4'-(1-phenylethylidene) bis(2-phenol), 4,4'-cyclohexylidenebis-(2-methylphenol) or terpenediphenol. Hydrogenated bisphenol A and a polypropylene oxide addition product of hydrogenated bisphenol A are preferred among others. The molecular weight of the above-mentioned polyol is preferably from 500 to 5000. When it is 500 or more, the solvent solubility is preferably high because of low urethane group concentration. On the other hand, when it is 5000 or less, the good coating film strength and the high durability are preferably obtained.

As the polyol having a cyclic structure, which is used as the chain extender, there can be used the above-mentioned cyclic structure-containing diol and one obtained by adding an alkylene oxide such as ethylene oxide or propylene oxide, within the molecular weight range of 200 to 500. Preferred examples thereof include hydrogenated bisphenol A and a polypropylene oxide addition product of hydrogenated bisphenol A.

(Polyurethane Resin (B))

The polyester polyol, a starting material for the polyurethane (B), comprises an aliphatic dibasic acid and an aliphatic diol having an alkyl branched side chain and no cyclic structure. As the aliphatic dibasic acid, there can be used an aliphatic dibasic acid such as succinic acid, adipic acid, azelaic acid, sebacic acid, malonic acid, glutaricacid pimelic acid or suberic acid. Preferred among others are succinic acid, adipic acid and sebacic acid. Of the whole dibasic acid components of the polyester polyol, the aliphatic dibasic acid preferably has a content of 70 mol % or more. When it is 70 mol % or more, the concentration of the dibasic acid having a cyclic structure is substantially low, so that the solvent solubility is high, which make it possible to obtain the good effect of improving dispersibility.

As the aliphatic diol having an alkyl branched side chain and no cyclic structure, which can be used in the polyester polyol, there can be used a branched aliphatic diol such as 2,2-dimethyl-1,3-propanediol, 3,3-dimethyl-1,5-pentanediol, 2-methyl-2-ethyl-1,3-propanediol, 3-methyl-3-ethyl-1,5-pentanediol, 2-methyl-2-propyl-1,3-propanediol, 3-methyl-3-propyl-1,5-pentanediol, 2-methyl-2-butyl-1,3-propanediol, 3-methyl-3-butyl-1,5-pentanediol, 2,2-diethyl-1,3-propanediol, 3,3-diethyl-1,5-propanediol, 2-ethyl-2-butyl-1,3-propanediol, 3-ethyl-3-butyl-1,5-pentanediol, 2-ethyl-2-propyl-1,3-propanediol, 3-ethyl-3-propyl-1,5-pentanediol, 2,2-dibutyl-1,3-propanediol, 3,3-dibutyl-1,5-pentanediol, 2,2-dipropyl-1,3-propanediol, 3,3-dipropyl-1,5-pentanediol, 2-butyl-2-propyl-1,3-propanediol, 3-butyl-3-propyl-1,5-pentanediol, 2-ethyl-1,3-propanediol, 2-propyl-1,3-propanediol, 2-butyl-1,3-propanediol, 3-ethyl-1,5-pentanediol, 3-propyl-1,5-pentanediol, 3-butyl-1,5-pentanediol, 3-octyl-1,5-pentanediol, 3-myristyl-1,5-pentanediol, 3-stearyl-1,5-pentanediol, 2-ethyl-1,6-hexanediol, 2-propyl-1,6-hexanediol, 2-butyl-1,6-hexanediol, 5-ethyl-1,9-nonanediol, 5-propyl-1,9-nonanediol or 5-butyl-1,9-nonanediol, 2,2-Dimethyl-1,3-propanediol, 2-ethyl-2-butyl-1,3-propanediol and 2,2-diethyl-1,3-propanediol are preferred among others. The content of the branched side chain-containing polyol in the polyols used in the polyester polyol is preferably from 50 to 100 mol %, and more preferably from 70 to 100 mol %. When it is within the above-mentioned range, the solvent solubility is high and the good dispersibility can be obtained.

In the polyurethane resin (B), the aliphatic diol having a branched alkyl side chain and 3 or more carbon atoms can be used as the chain extender. The aliphatic diol has the branched alkyl side chain and 3 or more carbon atoms, which improves the solvent solubility and makes it possible to obtain the good dispersibility.

As the aliphatic diol having the branched alkyl side chain and 3 or more carbon atoms, there can be used 2-methyl-2-ethyl-1,3-propanediol, 3-methyl-3-ethyl-1,5-pentanediol, 2-methyl-2-propyl-1,3-propanediol, 3-methyl-3-propyl-1,5-pentanediol, 2-methyl-2-butyl-1,3-propanediol, 3-methyl-3-butyl-1,5-pentanediol, 2,2-diethyl-1,3-propanediol, 3,3-diethyl-1,5-propanediol, 2-ethyl-2-butyl-1,3-propanediol, 3-ethyl-3-butyl-1,5-pentanediol, 2-ethyl-2-propyl-1,3-propanediol, 3-ethyl-3-propyl-1,5-pentanediol, 2,2-dibutyl-1,3-propanediol, 3,3-dibutyl-1,5-pentanediol, 2,2-dipropyl-1,3-propanediol, 3,3-dipropyl-1,5-pentanediol, 2-butyl-2-propyl-1,3-propanediol, 3-butyl-3-propyl-1,5-pentanediol, 2-ethyl-1,3-propanediol, 2-propyl-1,3-propanediol, 2-butyl-1,3-propanediol, 3-ethyl-1,5-pentanediol, 3-propyl-1,5-pentanediol, 3-butyl-1,5-pentanediol, 3-octyl-1,5-pentanediol, 3-myristyl-1,5-pentanediol, 3-stearyl-1,5-pentanediol, 2-ethyl-1,6-hexanediol, 2-propyl-1,6-hexanediol, 2-butyl-1,6-hexanediol, 5-ethyl-1,9-nonanediol, 5-propyl-1, 9-nonanediol, 5-butyl-1, 9-nonanediol or the like. 2-Ethyl-2-butyl-1,3-propanediol and 2,2-diethyl-1,3-propanediol are preferred among others. The content in the polyurethane resin is preferably from 5 to 30% by weight, and more preferably from 10 to 20% by weight. When it is within the above-mentioned range, the solvent solubility is high and the good dispersibility can be obtained.

(Polyurethane Resin (C))

The polyol compound having a cyclic structure and an alkyl group of 2 or more carbon atoms, which is a starting material for the polyurethane (C), is preferably a diol having a molecular weight of from 500 to 1000. The use of a diol preferably prevents the occurrence of gelation due to crosslinking in polyurethane polymerization. Further, when the carbon number of the alkyl group of the above-mentioned diol is 2 or more, the solvent solubility is high and the dispersibility is good. A molecular weight of 500 or more results in high solvent solubility because of low urethane group concentration, whereas 1000 or less results in good coating film strength. As the polyol having the cyclic structure and the alkyl group of 2 or more carbon atoms, preferred is a dimer diol represented by a structure of the following formula, which is obtained by hydrogenation and reduction of a dimer acid.

Dimer Diol:

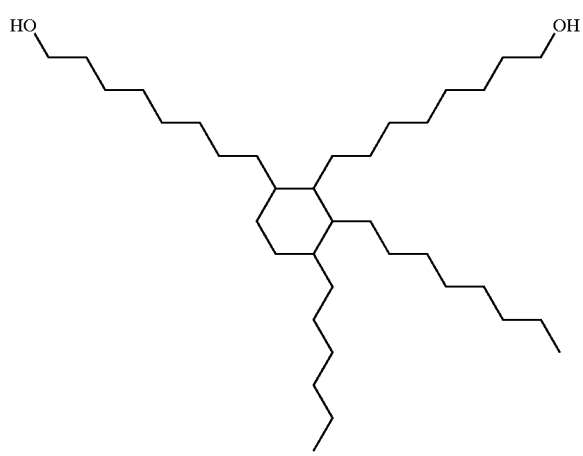

The diol having the cyclic structure and the alkyl group of 2 or more carbon atoms is contained in the polyurethane resin preferably in an amount of 5 to 60% by weight, and more preferably in an amount of 10 to 40% by weight. When the content of the diol having the cyclic structure and the alkyl group of 2 or more carbon atoms is within the above-mentioned range, the high solvent solubility, the good dispersibility and the high durability are preferably obtained.

In the invention, there is no particular limitation on the organic diisocyanate used for forming the polyurethane resin by reacting it with the above-mentioned polyol, and one generally used can be employed. Specific examples thereof include hexamethylene diisocyanate, tolidine diisocyanate, isophorone diisocyanate, 1,3-xylylene diisocyanate, 1,4-xylylene diisocyanate, cyclohexane diisocyanate, toluidine diisocyanate, 2,4-tolylene diisocyanate, 2,6-tolylene diisocyanate, 4,4'-diphenylmethane diisocyanate, p-phenylene diisocyanate, m-phenylene diisocyanate, 1,5-naphthalene diisocyanate, 3,3-dimethylphenylene diisocyanate and the like.

The polyurethane resin having a polar group can be produced by producing the polyurethane from a starting material monomer into which the polar group is introduced. For example, there can be used (1) a method of producing the polyurethane from a polar group-containing polyol such as a polyester polyol or polyether polyol having the polar group, and a diisocyanate, and (2) a method of producing the polyurethane by partly converting a dihydric alcohol or a dibasic acid to a polar group-containing polyol or a polar group-containing dibasic acid. The polar group-containing polyol or the polar group-containing dibasic acid is one containing in a main or side chain of the above-mentioned polyol or dibasic acid at least one polar group selected from —$SO_3M$, —$OSO_3M$, —$PO(OM)_2$, —$OPO(OM)_2$, —COOM (wherein M represents a hydrogen atom, an alkali metal or ammonium), —$CONR_1R_2$, —$NR_1R_2$ and —$N^+R_1R_2R_3$ (wherein $R_1$, $R_2$ and $R_3$ each independently represents a hydrogen atom or an alkyl group).

The average molecular weight of the polar group—containing polyurethane-based resin used in the invention is preferably from 5000 to 100000, and more preferably from 10000 to 50000. When it is 5000 or more, the physical strength such as the strength of the resulting magnetic coating film, and the durability of the magnetic recording medium is good. When the molecular weight is 100000 or less, the solubility in a solvent is high, and the dispersibility is improved. Further, the viscosity of a coating at a specified concentration is suitable, which causes good workability and easy handling.

In terms of hardenability and durability, it is preferred that the polar group-containing polyurethane-based resin used in the invention has branched OH groups, and the number thereof is preferably from 2 to 40 per molecule, and more preferably from 3 to 20 per molecule.

In the invention, a polyurethane resin other than the above-mentioned polyurethane resin can also be used together.

It is preferred that the polyurethane resin used together has a polar group similar to that of the above-mentioned polyurethane resin. Further, as the chain extender, there can be used a per se known substance, a polyhydric alcohol, an aliphatic polyamine, an alicyclic polyamine, an aromatic polyamine or the like. A polyhydric alcohol having a molecular weight of from 50 to 500 is preferred among others. When it 25 is 50 or more, the coating film strength is high, and the durability is good. On the other hand, when it is 500 or less, the durability is good, because the Tg is high and the coating film becomes hard. As the polyhydric alcohol, preferred is a short chain diol having a cyclic structure such as bisphenol A, hydrogenated bisphenol A, bisphenol S, bisphenol P, an ethylene oxide or propylene oxide addition product thereof, cyclohexanedimethanol, cyclohexanediol, hydroquinone, bis(2-hydroxyethyl) tetrabromobisphenol A, bis(2-hydroxyethyl) tetrabromobisphenol S, bis(2-hydroxyethyl) tetramethylbisphenol S, bis(2-hydroxyethyl) diphenylbisphenol S, bis(2-hydroxyethyl)diphenylbiphenol, bis(2-hydroxyethyl)thiodiphenol, bis(2-hydroxyethyl) bisphenol F, biphenol, bisphenolfluorene or bisphenolfluorene dihydroxyethyl ether. More preferred is an aromatic or alicyclicdiol such as bisphenol A, hydrogenated bisphenol A, bisphenol S, bisphenol P, an ethylene oxide or propylene oxide addition product thereof, cyclohexanedimethanol or cyclohexanediol.

Vinyl Chloride-based Resin

As the binder of the invention, there can also be used a vinyl chloride-based resin. As the vinyl chloride-based resin, there can be used one in which a vinyl chloride monomer is copolymerized with various monomers.

As the copolymerizable monomer, there is used a fatty acid vinyl ester such as vinyl acetate or vinyl propionate, an acrylate or methacrylate such as methyl(meth)acrylate, ethyl (meth)acrylate, isopropyl(meth)acrylate, butyl(meth) acrylate or benzyl(meth)acrylate, an alkyl allyl ether such as allyl methyl ether, allyl ethyl ether, allyl propyl ether or allyl butyl ether, or besides, styrene, α-methylstyrene, vinylidene chloride, acrylonitrile, ethylene, butadiene or acrylamide. Further, as the copolymerizable monomer having a functional group, there is used vinyl alcohol, 2-hydroxyethyl (meth)acrylate, polyethylene glycol(meth)acrylate, 2-hydroxypropyl(meth)acrylate, 3-hydroxypropyl(meth) acrylate, polypropylene glycol(meth)acrylate, 2-hydroxyethyl allyl ether, 2-hydroxypropyl allyl ether, 3-hydroxypropyl allyl ether, p-vinylphenol, maleic acid, maleic anhydride, acrylic acid, methacrylic acid, glycidyl (meth)acrylate, allyl glycidyl ether, phosphoethyl(meth) acrylate, sulfoethyl (meth)acrylate, p-styrenesulfonic acid, or an Na or K salt thereof.

When the composition of the vinyl chloride monomer in the vinyl chloride-based resin is from 75 to 95% by weight, the high mechanical strength, the good solvent solubility and the high magnetic substance dispersibility are preferably obtained.

Acrylic Resin

As the binder of the invention, there can be used an acrylic copolymer comprising 1% by weight to 75% by weight of nitrogen-containing radically polymerizable monomer units, 1% by weight to 75% by weight of aromatic ring-containing radically polymerizable monomer units and other radically polymerizable monomer units so as to give the total amount of 100% by weight, and having at least one polar group selected from —$SO_3M$, —$OSO_3M$, —$PO(OM)_2$, —$OPO(OM)_2$, —COOM (wherein M represents a hydrogen atom, an alkali metal or ammonium), —$CONR_1R_2$, —$NR_1R_2$ and —$N^+R_1R_2R_3$ (wherein $R_1$, $R_2$ and $R_3$ each independently represents a hydrogen atom or an alkyl group).

(Meth)acrylamide is the general term for acrylamide and methacrylamide, and a (meth)acrylate is the general term for an acrylate and a methacrylate.

The nitrogen-containing radically polymerizable monomer units used in the invention include a (meth)acrylamide derivative such as (meth)acrylamide, diacetone(meth) acrylamide, N-methylol(meth)acrylamide, N-methoxymethyl(meth)acrylamide, N-ethoxymethyl (meth)acrylamide, N-butoxymethyl(meth)acrylamide, N,N-dimethylaminopropyl(meth)acrylamide or N-isopropylacrylamide, a (meth)acrylate such as N,N-dimethylaminomethyl(meth)acrylate, N,N-dimethylaminoethyl(meth)acrylate, N,N-diethylaminomethyl(meth)acrylate, N,N-diethylaminoethyl (meth)acrylate, N,N-dimethylaminopropyl(meth)acrylate, (meth)acryloylmorpholine or morpholinoethyl(meth) acrylate, and a vinyl compound such as N-vinyloxazolidone, N-vinyl-2-pyrrolidone, N-vinylcarbazole, 2-vinyl-4,6-diamino-5-triazine, 2-vinylpyridine, 4-vinylpyridine, maleimide, N-phenylmaleimideoracrylonitrile. The nitrogen-containing radically polymerizable monomer units are particularly preferably N,N-dimethylaminopropylacrylamide, N-isopropylacrylamide and diacetoneacrylamide. The composition of the nitrogen-containing radically polymerizable monomer units is preferably from 1 to 75% by weight, and more preferably from 5 to 60% by weight. When it is within the above-mentioned range, the dispersibility of the non-magnetic powder and the magnetic powder can be improved.

As the aromatic ring-containing radically polymerizable monomer units used in the invention, there can be used aromatic ring-containing (meth)acrylate units. The aromatic ring-containing (meth)acrylate units include benzyl(meth) acrylate, phenoxyethyl(meth)acrylate, phenoxypolyethylene glycol(meth)acrylate, a (meth)acrylate of a nonylphenol ethylene oxide addition product, and the like. The aromatic ring-containing radically polymerizable monomer units are particularly preferably include benzyl(meth)acrylate and phenoxyethyl(meth)acrylate. The composition of the aromatic ring-containing radically polymerizable monomer units is preferably from 1 to 75% by weight, and more preferably from 5 to 60% by weight. When it is 1% by weight or more, the dispersibility of the non-magnetic powder or the magnetic powder can be improved, and the sufficient smoothness (gloss) and durability of the coating film can be obtained. On the other hand, 75% by weight or less results in the suitable viscosity of the coating.

The other copolymerizable monomer units copolymerizable with the nitrogen-containing radically polymerizable monomer units and the aromatic ring-containing radically polymerizable monomer units include an alkyl(meth) acrylate monomer such as methyl(meth)acrylate, ethyl (meth)acrylate, propyl(meth)acrylate, butyl(meth)acrylate, isobutyl(meth)acrylate, pentyl(meth)acrylate, hexyl(meth) acrylate, octyl(meth)acrylate, 2-ethylhexyl(meth)acrylate, lauryl(meth)acrylate, stearyl(meth)acrylate and cyclohexyl (meth)acrylate, an alkoxylalkyl(meth)acrylate such as methoxyethyl(meth)acrylate and butoxyethyl(meth) acrylate, an alkyl vinyl ether such as glycidyl(meth)acrylate, allyl glycidyl ether, methyl vinyl ether, ethyl vinyl ether, isobutyl vinyl ether, n-butyl vinyl ether, 2-ethylhexyl vinyl ether, n-octyl vinyl ether, lauryl vinyl ether, cetyl vinyl ether and stearyl vinyl ether, vinyl acetate, vinyl propionate, maleic acid (anhydride), acrylonitrile, vinylidene chloride and the like. These monomers may be used either alone or as a combination of two or more of them.

The number average molecular weight of the above-mentioned acrylic resin is preferably from 1000 to 200000, and more preferably from 10000 to 100000. When it is 1000 or more, the physical strength of the magnetic coating film is high, and the durability of a magnetic tape and the like is good. When it is 200000 or less, the viscosity of the coating film is low, resulting in good workability and easy handling.

As methods for introducing the polar groups with respect to the above-mentioned polar group-containing vinyl chloride-based and acrylic resins used in the invention, the following methods can be used.

To the vinyl chloride-based or acrylic resin comprising vinyl chloride-based monomer units, or nitrogen-containing radically polymerizable monomer units and aromatic ring-containing radically polymerizable monomer units, and containing no polar group represented by —$SO_3M$, —$OS_3M$, —$PO(OM)_2$, —$OPO(OM)_2$, —COOM (wherein M represents a hydrogen atom, an alkali metal or ammonium), —$CONR_1R_2$, —$NR_1R_2$ or —$N^+R_1R_2R_3$ (wherein $R_1$, $R_2$ and $R_3$ each independently represents a hydrogen atom or an alkyl group), at least one of the above-mentioned polar groups can be added by a reaction to conduct synthesis. Specifically, for example, when —$SO_3M$ is introduced into the vinyl chloride-based resin or the acrylic resin, the polar group can be introduced by first copolymerizing the vinyl chloride-based monomer, or the nitrogen-containing radically polymerizable monomer and the aromatic ring-containing radically polymerizable monomer, with a glycidyl group-containing copolymerizable compound and another compound copolymerizable therewith as needed, and reacting the copolymer with an —$SO_3M$-containing compound concurrently with the copolymerization or after the copolymer has been obtained. The copolymerizable compounds for introducing the glycidyl groups include glycidyl(meth)acrylate, glycidyl vinyl ether and the like, and these may be used either alone or as a combination of two or more of them at the same time.

A polar group-containing copolymerizable compound may be copolymerized with the vinyl chloride-based monomer, or a mixture of the nitrogen-containing radically polymerizable monomer and the aromatic ring-containing radically polymerizable monomer, and another copolymerizable compound.

As the polar group-containing copolymerizable compound, there can be used a copolymerizable compound containing at least one polar group selected from —$SO_3M$, —$OSO_3M$, —$PO(OM)_2$ —$OPO(OM)_2$ —COOM (wherein M represents a hydrogen atom, an alkali metal or ammonium), —$CONR_1R_2$, —$NR_1R_2$ and —$N^+R_1R_2R_3$ (wherein $R_1$, $R_2$ and $R_3$ each independently represents a hydrogen atom or an alkyl group). For example, the copolymerizable compounds for introducing —$SO_3M$ include an unsaturated hydrocarbon sulfonic acid such as 2-acrylamido-2-methylpropanesulfonic acid, vinylsulfonic acid or (meth)acrylsulfonic acid and a salt thereof, a sulfoalkyl(meth)acrylate such as sulfoethyl(meth)acrylate or sulfopropyl(meth)acrylate and a salt thereof, and the like. The above-mentioned hydrophilic polar groups may be used either alone or as a combination of two or more of them. When it is necessary to introduce —$NR_2$, as well as —$SO_3M$, there can be used an —$NR_2$-containing copolymerizable compound, specifically, N,N-dimethylaminopropylacrylamide, N-isopropylacrylamide or the like.

In order to introduce the polar group, there may be used a method of copolymerizing a monomer mixture using a polar group-containing radical polymerization initiator and a method of copolymerizing a monomer mixture in the presence of a chain transfer agent having the polar group at one terminal, in producing the copolymer.

The polar group-containing radical polymerization initiators include, from example, ammonium persulfate, potassium persulfate, sodium persulfate and the like. The amount of these radical polymerization initiators used is from 1 to 10% by weight, and preferably from 1 to 5% by weight. There is no particular limitation on the chain transfer agent having the above-mentioned polar group at one terminal, as long as it can chain transfer in polymerization and has the polar group at one terminal. The chain transfer agents include a halide compound, mercapto compound and diphenylpicrylhydrazine each having the polar group at one terminal. As specific examples of the halide compounds, there are exemplified 2-chloroethanesulfonic acid, sodium 2-chloroethanesulfonate, 4-chlorophenyl sulfoxide, 4-chlorobenzenesulfonamide, p-chlorobenzenesulfonic acid, sodium p-chlorobenzenesulfonate, sodium 2-bromoethanesulfonate, sodium 4-(bromomethyl) benzenesulfonate and the like. Preferred are sodium 2-chloroethanesulfonate and sodium p-chlorobenzenesulfonate. As the mercapto compound, there can be preferably used 2-mercaptoethanesulfonic acid (salt), 3-mercapto-1,2-propanediol, mercaptoacetic acid (salt), 2-mercapto-5-benzimidazolesulfonic acid (salt), 3-mercapto-2-butanol, 2-mercaptobutanol, 3-mercapto-2-propanol, N-(2-mercaptopropyl)glycine, ammonium thioglycolate or β-mercaptoethylamine hydrochloride. These chain transfer agents each having the polar group at one terminal can be used either alone or as a combination of two or more of them. The chain transfer agent having the polar group at one terminal is particularly preferably 2-mercaptoethanesulfonic acid (salt). The amount of these chain transfer agents used is preferably from 0.1 to 10% by weight, and more preferably from 0.2 to 5% by weight, based on the total amount of the monomers.

A hydroxyl group is also preferably contained, together with at least one polar group selected from —$SO_3M$, —$OSO_3M$, —$PO(OM)_2$, —$OPO(OM)_2$, —COOM (wherein M represents a hydrogen atom, an alkali metal or ammonium), —$CONR_1R_2$, —$NR_1R_2$ and —$N^+R_1R_2R_3$ (wherein $R_1$, $R_2$ and $R_3$ each independently represents a hydrogen atom or an alkyl group). Examples of the hydroxyl group-containing copolymerizable units include a hydroxyalkyl(meth)acrylate such as hydroxyethyl(meth) acrylate, hydroxypropyl(meth)acrylate, polyethylene glycol mono(meth)acrylate, polypropylene glycol mono(meth) acrylate, polyethylene glycol polypropylene glycol mono (meth)acrylate, glycerol mono(meth)acrylate or 3-chloro-2-hydroxypropyl(meth)acrylate, a vinyl ether such as hydroxyethyl vinyl ether, hydroxypropyl vinyl ether or hydroxybutyl vinyl ether, a (meta)allyl ether such as hydroxyethyl mono(meta)allyl ether, hydroxypropyl mono (meta)allyl ether, hydroxybutyl mono(meta)allyl ether, diethylene glycol mono(meta)allyl ether, dipropylene glycol mono(meta)allyl ether, glycerol mono(meta)allyl ether or 3-chloro-2-hydroxypropyl(meta)allyl ether, (meta)allyl alcohol and the like. The vinyl alcohol units can be introduced by copolymerizing vinyl acetate, and conducting saponification with a caustic alkali in a solvent. The amount of the hydroxyl group-containing monomer is preferably from 5 to 30% by weight based on the whole monomers.

In order to polymerize a polymerization reaction system containing the above-mentioned polymerizable compound and chain transfer agent, a known polymerization process, for example, suspension polymerization, emulsion polymerization, solution polymerization or the like, can be used. Of these polymerization processes, suspension polymerization or emulsion polymerization having good drying workability is preferably used from the viewpoint of easy storage of the resulting acrylic copolymer in a solid form high in storage stability, and emulsion polymerization is particularly preferred used. Although the polymerization conditions vary depending on the kinds of polymerizable compound, polymerization initiator and chain transfer agent used, it is generally preferred that the temperature is from about 50 to about 80° C., the gauge pressure is from about 4.0 to about 1.0 MPa, and the time is from about 5 to about 30 hours, in an autoclave. It is preferred in respect to easy reaction control that the polymerization is conducted in an atmosphere of a gas inactive to the reaction. Such gases include, for example, nitrogen, argon and the like, and nitrogen is preferably used in respect to economical efficiency. In the polymerization, in addition to the above-mentioned components, other components may be added to the above-mentioned polymerization reaction system. Such components include, for example, an emulsifier, an electrolyte, a polymer protective colloid and the like.

In the invention, the above-mentioned polyurethane resin, vinyl chloride-based resin and acrylic resin can also be used together. Further, a binder having another polar group may be used together in an amount identical to or less than the total amount of these resins.

There is no particular limitation on the other resin which an be used together, and there can be used a known thermoplastic resin, thermosetting resin or reactive resin, or a mixture hereof. As the thermoplastic resin, there can be used one having a glass transition temperature of from −100 to 150° C. and a number average molecular weight of from 1000 to 200000, preferably from 10000 to 100000. Specifically, there are polymers, copolymers and various rubber-based resins containing vinylidene chloride, acrylonitrile, styrene, butadiene, ethylene, vinyl butyral, vinyl acetal, vinyl ether and the like as constituent units. Further, the thermosetting resin or the reactive resins include a phenol resin, a phenoxy resin, an epoxy resin, a urea resin, a melamine resin, an alkyd resin, an acrylic reactive resin, a formaldehyde resin, a silicone resin, an epoxy-polyamide resin, a mixture of a polyester resin and an isocyanate prepolymer and the like.

The above-mentioned binder can be used in a content ranging from 5 to 50 parts by weight based on 100 parts by weight of the ferromagnetic powder or the non-magnetic powder. The phenomenon that the glossiness of a surface of the magnetic layer or non-magnetic layer becomes high, or the like, appears by setting the content to within the range from 7 to 45 parts by weight, which reveals that the dispersed state of the ferromagnetic powder or non-magnetic powder is good. Further, the electromagnetic characteristics are significantly improved by setting the content to within the range from 10 to 40 parts by weight. When the content is less than 40 parts by weight, the ferromagnetic powder or non-magnetic powder is not bound to cause a deterioration of running durability and the like. On the other hand, even when the binder is blended in an amount exceeding 200 parts by weight, the dispersed state of the ferromagnetic powder or non-magnetic powder is not further improved, resulting in a decrease in the filling rate of the ferromagnetic powder in the magnetic layer to deteriorate the electromagnetic characteristics in some cases.

Ferromagnetic Powder

The ferromagnetic powder used in at least one or more magnetic layers of the invention is a ferromagnetic hexagonal ferrite powder having an average tabular diameter of from 10 to 40 nm. The use of the fine particle magnetic substance can provide the magnetic recording medium having high surface smoothness and good electromagnetic characteristics.

The average tabular diameter of the ferromagnetic hexagonal ferrite powder is from 10 to 40 nm, preferably from 10 to 35 nm, and more preferably from 15 to 30 nm. In particular, when reproduction is carried out with an MR head in order to increasing track density, it is necessary to decrease noise. When the tabular diameter is less than 10 nm, stable magnetization can not be desired because of a deterioration of thermal stability. Exceeding 40 nm results in high noise. Both are unsuitable for high-density magnetic recording.

The tabular ratio (tabular diameter/plate thickness) of the ferromagnetic hexagonal ferrite powder is desirably from 1 to 15, and preferably from 1 to 7. When the tabular ratio is small, filling properties in the magnetic layer are preferably improved, but sufficient orientation is not obtained. Exceeding 15 results in an increase in noise caused by stacking between particles. Within this particle size range, the specific surface area measured by the BET method shows from 10 to 100 $m^2/g$. The specific surface area generally agrees with the arithmetically calculated value from the tabular diameter and plate thickness of the particles. It is usually preferred that the distribution of the tabular diameter and plate thickness of the particles is narrower. Although measurement in numerical terms is difficult, comparisons can be made by measuring 500 particles at random on a TEM photograph of the particles. Although the distribution is not normal distribution in many cases, $\pi$/average tabular diameter=0.1 to 2.0 when represented by the standard deviation to the average size by calculation. In order to sharpen the particle size distribution, treatment for improving distribution is also applied to the particles formed, as well as a particle formation reaction system is made as homogeneous as possible. For example, there is also known a method of selectively dissolving ultra-fine particles in an acid solution, and the like.

Further, in producing the magnetic recording medium of he invention, the water content of the ferromagnetic hexagonal ferrite powder at the time when it is dispersed in the magnetic coating is from 0.3 to 3% by weight, and preferably from 0.5 to 1.5% by weight. The water content within the above-mentioned range optimizes adsorption of the polar group-containing binder described in the claim on the magnetic substance to improve dispersibility, and the recording medium formed shows high S/N. When the water content is less than 0.3% by weight, the binder is not sufficiently adsorbed to unfavorably lower dispersibility. When the water content exceeds 3% by weight, the reaction with the polyisocyanate in the magnetic coating proceeds to unfavorably cause an increase in the viscosity of the magnetic coating.

The adjustment of the water content can be carried out by drying and humidification after the preparation of the magnetic substance.

Water content measurements are made by the Karl Fisher method as described below. Using a vaporizer (VA-05) manufactured by Mitsubishi Chemical Corporation, equipped with a trace moisture meter (CA-05), a carrier gas ($N_2$) was allowed to flow at a flow rate of 300 ml/min at a vaporizer temperature of 120° C., and about 300 mg of a sample is precisely weighed. Then, the water content of the sample is calculated from the absolute water amount obtained by a specified operation by the following equation:

$$\text{Water Content } (\%) = A/(10 \times S)$$

wherein A: water amount ($\mu$g) and S: sample amount (mg). X means "times".

The ferromagnetic hexagonal ferrite powder having a coercive force Hc of from about 39.8 to about 398 kA/m (from about 500 Oe to about 5000 Oe) can be produced. The higher Hc is advantageous for high-density recording, but the capacity of a recording head is limited. In the invention, the Hc is from about 159 to about 239 kA/m (from about 2000 to about 3000 Oe), and preferably from 159 to 320 kA/m (from 2200 to 2800 Oe). When the saturation magnetic flux density of the head exceeds 1.4 teslas, the Hc is preferably 159 kA/m (2000 Oe) or more. The Hc can be controlled by the particle size (tabular diameter and plate-thickness), the kind and amount of element contained, the site at which an element is substituted, the conditions of particle formation, and the like. The saturation magnetization as is from 40 to 80 A·m²/kg (from 40 to 80 emu/g). The higher as is preferred, but it tends to be decreased as the particle size becomes finer. In order to improve the as, it is well known that spinel ferrite is compounded with magnetoplumbite ferrite, or that the kind of element contained and the amount thereof added are selected. Further, the use of W type hexagonal ferrite is also possible.

As methods for producing the ferromagnetic hexagonal ferrite powder, there are the following methods, but any methods are used in the invention.

(1) A glass crystallization method of mixing metal oxides substituting barium oxide-iron oxide-iron with boron oxide as a glass-forming material so as to give a desired ferrite composition, followed by melting and rapid cooling to form an amorphous material, and then, heat treating it again, followed by washing and pulverization to obtain a crystalline barium ferrite powder;

(2) A hydrothermal reaction method of neutralizing a barium ferrite composition metal salt solution with an alkali, removing by-products, and then, heating at 100° C. or more in a liquid phase, followed by washing, drying and pulverization to obtain a crystalline barium ferrite powder; and (3) A co-precipitation method of neutralizing a barium ferrite composition metal salt solution with an alkali, and removing by-products, followed by drying, treatment at 1100° C. or less and pulverization to obtain a crystalline barium ferrite powder.

In dispersing the ferromagnetic hexagonal ferrite powder, it is also carried out that surfaces of the particles are treated with a material suitable for a dispersing medium or the binder. As surface treating materials, there are used inorganic compounds and organic compounds. Typical examples of such compounds include compounds of Si, Al, P and the like, various kinds of silane coupling agents and various kinds of titanium coupling agents. The amount thereof is suitably from 0.1 to 10% based on the magnetic material. The pH of the magnetic material is also important for dispersion. It is usually from about 4 to about 12, and has an optimum value depending on the dispersing medium and the polymer. However, considering chemical stability and keeping quality of the magnetic recording medium, a value ranging from about 6 to about 11 is selected.

Abrasive

In the magnetic recording medium of the invention, a diamond is preferably used as an abrasive. The use of a small amount of the diamond can ensure durability, and extremely decreases adverse effect to aggregation of the magnetic substance and other defects of the magnetic layer. Accordingly, noise can be remarkably improved, and the output is also somewhat increased. Thus, the magnetic recording medium in which excellent high-density recording is compatible with running durability can be obtained.

For the diamond used as the abrasive, the average particle size is from 0.03 to 0.5 μm, and preferably from 0.05 to 0.30 μm. When the average particle size is less than 0.03 μm, the effect of improving durability to the amount added is decreased. When it exceeds 0.5 μm, noise is increased although durability is excellent. In the invention, the maximum size of each diamond article is taken as the particle size, and the average particle size means an average value of measurements of 500 particles randomly drawn from an electron microscope.

The amount of the diamond added is from 0.1 to 5% by weight, and preferably within the range from 0.03 to 3.00% by weight, based on the ferromagnetic hexagonal ferrite powder. Less than 0.01% by weight results in difficulty in ensuring durability, whereas exceeding 5% by weight results in a reduction in the noise reducing effect by the addition of the diamond. From the viewpoints of noise and durability, the amount of the diamond added and the average particle size thereof are preferably within the above-mentioned ranges. However, from the viewpoint of noise, it is preferred that the amount of the diamond added is minimized. In the magnetic recording medium of the invention, it is preferred that the amount of the diamond added and the average particle size thereof better suited for a magnetic read-write apparatus are properly selected from the above-mentioned ranges.

Further, for the particle size distribution of the diamond, particles having a particle size of 200% or more of the average particle size is preferably 5% or less of the whole diamond particles in number, and particles having a particle size of 50% or less of the average particle size is preferably 20% or less of the whole diamond particles in number. The maximum value of the particle size of the diamond used in the invention s usually 3.00 μm, and preferably about 2.00 μm. The minimum size thereof is usually 0.01 μm, and preferably about 0.02 μm.

For the measurement of the particle size distribution, the number of the particles is counted on the basis of the average particle size in the above-mentioned measurement of the particle size, there by determining the particle size distribution. The particle size distribution of the diamond also has effects on durability and noise. When the particle size distribution is wider than the above-mentioned range, the effect corresponding to the above-mentioned average particle size is shifted. That is to say, when many particles have a particle size too large, noise is increased, or the head is damaged. On the other hand, many fine particles results in the insufficient abrasive effect. Further, a diamond having an extremely narrow particle size distribution goes up in price. The particle size distribution within the above-mentioned range is advantageous with respect to cost. The use of the fine diamond particles having a high hardness and a sharp particle size distribution is advantageous from the viewpoint of noise, because the abrasive effect at a similar level can be expected even when the content thereof is smaller than that of a conventional abrasive.

Further, in the invention, an abrasive conventionally used, for example, an abrasive such as alumina and SiC, can also be used in combination with the diamond. When used in combination, the abrasive is preferably sued in an amount of 500% by weight or less based on the diamond. The use of only a small amount of diamond is so much the better for the effect to durability and SN ratio. However, the abrasive other than the diamond, such as alumina and SiC, may be added for reasons of cost and the like. In this case, the amount can also be considerably decreased, compared to the amount of alumina alone added necessary for durability, because the diamond is contained. This is also advantageous from the viewpoints of ensuring of durability and a reduction in noise.

As the diamond used in the invention, there is ordinarily used an artificial diamond, because a natural diamond is expensive. As methods for producing the diamond, there are a dynamic synthesis method, a gas phase synthesis method and the like, as well as a method of forming the diamond via graphite, iron, Co, Ni and the like at high temperature and high pressure and a method called a static synthesis method in which graphite or furan resin carbon is allowed to react at high temperature and high pressure. Any methods are used in the invention.

Industrially, a diamond used in cutting and grinding, from which impurities are discriminately washed, is used, and it is also possible to use secondarily. In the invention, the distribution of the diamond particles is preferably within the above-mentioned range. As methods for classifying the diamond particles, there are a method using centrifugal force from a dispersion, a method using a special mesh filter, and the like.

The diamond can also be combined with another abrasive, as described above. The other abrasives include a known material having a Mohs' hardness of 6 or more such as the above-mentioned alumina abrasive, for example, α-alumina having an α-conversion of 90% or more or β-alumina, besides, silicon carbide, chromium oxide, cerium oxide, α-iron oxide, corundum, silicon nitride, silicon carbide, titanium carbide, titanium oxide, silicon dioxide, boron nitride and the like. They may be used either alone or as a combination. Further, the other abrasives may be used alone without using them in combination with the diamond. Furthermore, a composite material composed of these abrasives (obtained by surface treating an abrasive with another abrasive) may be used. In some cases, these abrasives may contain some compounds or elements other than the main components. However, the effect is unchanged as long as the main components are contained in an amount of 90% or more. The particle size of these abrasives is preferably from 0.01 to 2 µm. In particular, in order to improve electromagnetic characteristics, the narrower particle size distribution thereof is preferred. Further, in order to improve durability, it is also possible to combine abrasives different in particle size as needed, or to widen the particle size distribution of a single abrasive to give a similar effect as described above. It is preferred that the abrasives have a tap density of from 0.3 to 2 g/cc, a water content of from 0.1 to 5% by weight, a pH of from 2 to 11 and a specific surface area of from 1 to 30 m²/g. The shape of the abrasives used in the invention may be any of acicular, spherical and die-like forms. However, one having a corner as a part of the shape is preferred because of high abrasive quality. Specific examples thereof include AKP-12, AKP-15, AKP-20, AKP-30, AKP-50, HIT20, HIT-30, HIT-55, HIT60, HIT70, HIT80 and HIT100 manufactured by Sumitomo Chemical Co., Ltd.; ERC-DMB, HP-DBM and HPS-DBM manufactured by Reynolds, WA 10000 manufactured by Fujimi Kenmazai Co., Ltd.; UB 20 manufactured by Uemura Kogyo Co., Ltd.; G-5, Clomex U2 and Clomex U1 manufactured by Nippon Chemical Industrial Co., Ltd.; TF 100 and TF 140 manufactured by Toda Kogyo Co., Ltd.; Beta Random Ultrafine manufactured by Ibiden Co., Ltd.; and B-3 manufactured by Showa Mining Co., Ltd. These abrasives can also be added to the -non-magnetic layer as needed. Addition thereof to the non-magnetic layer can control the surface shape and the state of the abrasive projected. The particle size and amount of the abrasive added to the magnetic layer or the non-magnetic layer should be set, of course, to optimum values.

Non-magnetic Layer

The magnetic recording medium of the invention can also have the non-magnetic layer comprising the binder and the non-magnetic powder on the non-magnetic support, as a lower layer for the magnetic layer.

The non-magnetic powder available in the non-magnetic layer may be either an inorganic material or an organic material. Further, carbon black and the like can also be used. The inorganic materials include, for example, a metal, a metal oxide, a metal carbonate, a metal sulfate, a metal nitride, a metal carbide, a metal sulfide and the like. Specifically, a titanium oxide such as titanium dioxide, cerium oxide, tin oxide, tungsten oxide, ZnO, $ZrO_2$, $SiO_2$, $Cr_2O_3$, α-alumina having an α-conversion of from 90% to 100%, β-alumina, γ-alumina, α-iron oxide, goethite, corundum, silicon nitride, titanium carbide, magnesium oxide, boron nitride, molybdenumdisulfide, copper oxide, $MgCO_3$, $CaCO_3$, $BaCO_3$, $SrCO_3$, $BaSO_4$, silicon carbide, titanium carbide and the like can be used either alone or as a combination of two or more of them. α-Iron oxide and titanium oxide are preferred among others. The shape of the non-magnetic powder may be any of acicular, spherical, polyhedral and tabular forms. The crystallite size of the non-magnetic powder is preferably from 4 nm to 1 µm, and more preferably from 40 nm to 100 nm. 4 nm or more results in good dispersibility, whereas 1 µm or less results in good surface smoothness. The particle size of these non-magnetic powders is preferably from 5 nm to 2 µm, and more preferably from 100 to 200 nm. Non-magnetic powders different in particle size can be combined as needed, or the particle size distribution of a single non-magnetic powder can be widened to give a similar effect. 5 nm or more results in good dispersibility, whereas 2 µm or less results in good surface smoothness.

The specific surface area of the non-magnetic powder is preferably from 1 to 100 m²/g, more preferably from 5 to 70 m²/g, and particularly preferably from 10 to 65 m²/g. 1 m²/g or more results in good surface smoothness, whereas 100 m²/g or less results in good dispersibility such that dispersion is possible in a desired binder amount. The oil absorption using dibutyl phthalate (DBP) is suitably from 5 to 100 ml/100 g, preferably from 10 to 80 ml/100 g, and more preferably from 20 to 60 ml/100 g. The specific gravity is suitably from 1 to 12, and preferably from 3 to 6. The tap density is suitably from 0.05 to 2 g/ml, and preferably from 0.2 to 1.5 g/ml. When it is 0.05 g/ml or more, few particles are scattered. When it is 2 g/ml or less, the powder does not adhere to the apparatus. Both are good in operationality.

The pH of the non-magnetic powder is preferably from 2 to 11, an particularly preferably between 6 and 9. when the pH is 2 or more, the coefficient of friction at high temperature and high humidity is low. When the pH is 11 or less, the amount of fatty acid liberated increases, resulting in a tendency to decrease the coefficient of friction.

The water content of the non-magnetic powder is suitably from 0.1 to 5% by weight, preferably from 0.2 to 3% by weight, and more preferably from 0.3 to 1.5% by weight. 0.1% by weight or more results in good dispersibility, whereas 5% by weight or less tends to stabilize the viscosity of the coating. The ignition loss is preferably 20% by weight or less, and one having a small ignition loss is preferred. Further, when the non-magnetic powder is the inorganic powder, one having a Mohs hardness of from 4 to 10 is preferred. The stearic acid adsorption of the non-magnetic powder is suitably from 1 to 20 $\mu mol/m^2$, and preferably from 2 to 15 $\mu mol/m^2$. The heat of wetting of the non-magnetic powder to water at 25° C. is preferably within the range from 20 to 60 $\mu J/cm^2$ (from 200 to 600 $erg/cm^2$). Further, a solvent having a heat of wetting within this range can be used. The amount of water molecules on a surface at 100 to 400° C. is suitably from 1 to 10 molecules/100 angstroms. The pH of the isoelectric point in water is preferably between 3 and 9.

Surfaces of these non-magnetic powders are preferably surface treated with $Al_2O_3$, $SiO_2$, $TiO_2$, $ZrO_2$, $SnO_2$, $Sb_2O_3$ or ZnO. Particularly preferred for dispersibility are $Al_2O_3$, $SiO_2$, $TiO_2$ and $ZrO_2$, and more preferred are $Al_2O_3$, $SiO_2$ and $ZrO_2$. These may be used either alone or in combination. Further, a surface treatment layer co-precipitated may be used depending on the purpose. A method of first treating with alumina, and then treating a surface thereof with silica, or a reverse method thereof can also be employed. Further, although the surface treatment layer may be a porous layer depending on the purpose, it is generally preferred that the surface treatment layer is homogeneous and dense.

Specific examples of the non-magnetic powders used in the lower layers of the invention include Nanotite manufactured by Showa Denko K. K.; HIT-100 and ZA-GL manufactured by Sumitomo Chemical Co., Ltd.; DPN-250, DPN-250BX, DPN-245, DPN-270BX, DPB-500BX and DPN-550RX manufactured by Toda Kogyo Co., Ltd.; titanium oxide TTO-51B, TTO-55A, TTO-55B, TTO-55C, TTO-55S, TTO-55D, SN-100 and MJ-7, and α-iron oxide E270, E271 and E300 manufactured by Ishihara Sangyo Kaisha, Ltd.; STT-4D, STT-30D, STT-30 and STT-65C manufactured by Titan Kogyo K. K.; MT-100S, MT-100T, MT-150W, MT-500B, MT-600B, MT-100F and MT-50OHD manufactured by Teika Co., Ltd.; FINEX-25, BF-1, BF-10, BF-20 and ST-M manufactured by Sakai Chemical Industry Co., Ltd.; DEFIC-Y and DEFIC-R manufactured by Dowa Kogyo Co., Ltd.; AS2BM and $TiO_2$ P25 manufactured by Nippon Aerosil Co., Ltd.; 100A and 500A manufactured by Ube Industries, Ltd.; and Y-LOP manufactured by Titan Kogyo K. K. and a burned product thereof. Particularly preferred non-magnetic powders are titanium dioxide and α-iron oxide.

Together with the non-magnetic powder, carbon black can be added to the lower layer to reduce the surface electrical resistance (Rs) and to decrease the light transmittance. At the same time, the desired micro Vickers hardness can be obtained. The micro Vickers hardness of the lower non-magnetic layer is usually from 25 to 60 $kg/mm^2$, and preferably from 30 to 50 $kg/mm^2$ in order to adjust head contact. It can be measured with a thin film hardness meter (HMA-400, manufactured by NEC Corp.) using a triangular pyramid diamond needle having a sharpness of 80 degrees and a tip radius of 0.1 $\mu m$ as a penetrator tip. The light transmittance is generally standardized to be that the absorption of an infrared ray having a wavelength of about 900 nm is 3% or less, for example, 0.8% or less for a magnetic tape for VHS. For this purpose, furnace black for rubber, thermal black for rubber, coloring black, acetylene black and the like can be used.

The specific surface area of the carbon black used in the non-magnetic layer of the invention is from 100 to 500 $m^2/g$, and preferably from 150 to 400 $m^2/g$, and the DBP oil absorption is suitably from 20 to 400 ml/100 g, and preferably from 30 to 400 ml/100 g. The particle size of the carbon black is suitably from 5 to 80 nm, preferably from 10 to 50 nm, and more preferably from 10 to 40 nm. The pH of the carbon black is preferably from 2 to 10, the water content is preferably from 0.1 to 10%, and the tap density is preferably from 0.1 to 1 g/ml. Specific examples of the carbon black used in the invention include BLACKPEARLS 2000, 1300, 1000, 900, 800, 880 and 700, and VULCANXC-72 manufactured by Cabot; #3050B, #3150B, #3250B, #3750B, #3950, #950, #650B, #970B, #860B and MA-600 manufactured by Mitsubishi Kasei Corp.; CONDUCTEX SC, RAVEN 8800, 8000, 7000, 5750, 5250, 3500, 2100, 2000, 1800, 1500, 1255 and 1250 manufactured by Colombia Carbon; and Ketchen Black EC manufactured by AKZO. Carbon black surface treated with a dispersing agent or the like, grafted with a resin, or partly surface graphitized may be used. Further, the carbon black may be previously dispersed with a binder before it is added to the coating. The carbon black can be used within the range not exceeding 50% by weight based on the above-mentioned inorganic powder, and within the range not exceeding 40% based on the total weight of the non-magnetic layer. These carbon blacks can be used alone or in combination. For the carbon black which can be used in the non-magnetic layer of the invention, reference can be made to, for example, "Carbon Black Binran (Handbook of Carbon Black)" edited by Carbon Black-Association The organic powder can also be added to the non-magnetic layer depending on the purpose. Although examples thereof include an acrylstyrenic resin powder, a benzoguanamine resin powder, a melamine-based resin powder and a phthalocyanine-based resin powder, there can also be used a polyolefinic resin powder, a polyester-based resin powder, a polyamide-based resin powder, a polyimide-based resin powder and a polyethylene fluoride resin.

Other Additives

In the magnetic recording medium of the invention, the magnetic layer or the lower non-magnetic layer may contain an additive for imparting a dispersion effect, a lubrication effect, an antistatic effect or a plasticizing effect.

As these additives, there can be used molybdenumdisulfide, tungsten disulfide, graphite, boron nitride, fluorinated graphite, silicone oil, a polar group-containing silicone, a fatty acid-modified silicone, a fluorine-containing silicone, a fluorine-containing alcohol, a fluorine-containing ester, a polyolefin, a polyglycol, a polyphenyl ether, an aromatic ring-containing organic phosphonic acid such as phenylphosphonic acid, a benzylphosphonic acid, phenethylphosphonic acid, α-methylbenzylphosphonic acid, 1-methyl-1phenethylphosphonic acid, diphenylmethylphosphonic acid, biphenylphosphonic acid, benzylphenylphosphonic acid, α-cumylphosphonic acid, toluylphosphonic acid, xylylphosphonic acid, ethylphenylphosphonic acid, cumenylphosphonic acid, propylphenylphosphonic acid, butylphenylphosphonic acid, heptylphenylphosphonic acid, octylphenylphosphonic acid or nonylphenylphosphonic acid and an alkali metal salt thereof, an alkylphosphonic acid such as octylphosphonic acid, 2-ethylhexylphosphonic acid, isooctylphosphonic acid, (iso)nonylphosphonic acid, (iso)decylphosphonic acid, (iso)undecylphosphonic acid, (iso)dodecylphosphonic acid, (iso)hexadecylphosphonic acid, (iso)octadecylphosphonic acid or eicosylphosphonic acid and an alkali metal salt thereof, an aromatic phosphate such as phenyl phosphate, benzyl phosphate, phenethyl phosphate, α-methylbenzyl phosphate, 1-methyl-1-phenethyl phosphate, diphenylmethyl phosphate, biphenyl phosphate, benzylphenyl phosphate, α-cumyl phosphate, toluyl phosphate, xylyl phosphate, ethylphenyl phosphate, cumenyl phosphate, propylphenyl phosphate, butylphenyl phosphate, octylphenyl phosphate or nonylphenyl phosphate and an alkali metal salt thereof, an alkyl phosphate such as octyl phosphate, 2-ethylhexyl phosphate, isooctyl phosphate, (iso)nonyl phosphate, (iso)decyl phosphate, (iso)undecyl phosphate, (iso)dodecyl phosphate, (iso)hexadecyl phosphate, (iso)octadecyl phosphate or (iso)eicosyl phosphate and an alkali metal salt thereof, an alkyl sulfonate and an alkali metal salt thereof, α-monobasic fatty acid having from 10 to 24 carbon atoms, which may contain an unsaturated bond or may be branched, such as lauric acid, myristic acid, palmitic acid, stearic acid, behenic acid, butyl stearate, oleic acid, linolic acid, linolenic acid, elaidic acid or erucic acid, and a metal salt thereof, or a mono-, di- or multivalent-fatty acid ester composed of a monobasic fatty acid having from 10 to 24 carbon atoms, which may contain an unsaturated bond or may be branched, and any one of a monohydric to hexahydric alcohol having from 2 to 22 carbon atoms, which may contain an unsaturated bond or may be branched, an alkoxyl alcohol having from 12 to 22 carbon atoms, which may contain an unsaturated bond or may be branched, and a monoalkyl ether of an alkylene oxide polymer, such as butyl stearate, octyl stearate, amyl stearate isooctyl stearate, octylmyristate, butyl laurate, butoxyethyl stearate, anhydrosorbitan monostearate, anhydrosorbitan distearate or anhydrosorbitan tristearate, a fatty acid amide having 2 to 22 carbon atoms and an aliphatic amine having 8 to 22 carbon atoms. Further, there may be used one having an alkyl, aryl or aralkyl group substituted by a group other than the above-mentioned hydrocarbon groups, such as a nitro group or a halogen-containing hydrocarbon such as F, Cl, Br, $CF_3$, $CCl_3$ or $CBr_3$. In addition, there can also be used a nonionic surfactant such as an alkylene oxide-based compound, a glycerin-based compound, a glycidol-based compound or an alkylphenol-ethylene oxide addition product; a cationic surfactant such as a cyclic amine, an ester amide, a quaternary ammonium salt, a hydantoin derivative, a heterocyclic compound, a phosphonium or a sulfonium; an anionic surfactant containing an acidic group such as a carboxylic acid, a sulfonic acid or a sulfate group; and an amphoteric surfactant such as an amino acid, an aminosulfonic acid, a sulfate or a phosphate of an aminoalcohol, or an alkylbetaine. These surfactants are described in detail in "Kaimen Kasseizai Binran (Handbook of Surfactants)" published by Sangyo Tosho Co., Ltd. These lubricants and antistatic agents are not necessarily pure, and may further contain impurities such as isomers, unreacted products, by-products, decomposed products and oxidation products, in addition to the main components. The amount of these impurities is preferably 30% by weight or less, and more preferably 10% by weight or less.

Specific examples of these include NAA-102, caster oil-hardened fatty acid, NAA-42, Cation SA, Naimeen L-201, Nonion E-208, Anon BF and Anon LG manufactured by Nippon Oil & Fats Co., Ltd.; FAL-205 and FAL-123 manufactured by Takemoto Oil & Fat Co., Ltd.; Enujerub OL manufactured by New Japan Chemical Co., Ltd.; TA-3 manufactured by Shin-Etsu Chemical Co., Ltd.; Armide manufactured by Lion Armur Co., Ltd; Duomin TDO manufactured by Lion Corp.; BA-41G manufactured by Nissin Oil Mills, Ltd.; Profan 2012E, Newpole PE61 and Ionet MS-400 manufactured by Sanyo Chemical Industries, Ltd.

For these dispersing agents, lubricants and surfactants used in the invention, the kind and amount thereof can be properly selected as needed in the non-magnetic layer and the magnetic layer. For example, although not limited, of course, to only the example shown herein, the dispersing agent has the property of being adsorbed or bonded with a polar group, and is mainly adsorbed or bonded onto a surface of the ferromagnetic powder in the magnetic layer and onto a surface of the non-magnetic powder with the above-mentioned polar group. It is therefore presumed that the organic phosphorus compound once adsorbed is difficult to be desorbed from a surface of a metal, a metal compound or the like. Accordingly, the surface of the ferromagnetic powder or the surface of the non-magnetic layer of the invention becomes a state as covered with the alkyl group, the aromatic group or the like, so that the affinity of the ferromagnetic powder or the non-magnetic powder for the binder resin component is improved, and further, the dispersion stability of the ferromagnetic powder or the non-magnetic powder is also improved. Further, the lubricant exists in the free state, so that it is conceivable to use fatty acids different in melting point in the non-magnetic layer and the magnetic layer, respectively, to control their bleeding to the surface, to use esters different in boiling point or in melting point in the non-magnetic layer and the magnetic layer, respectively, to control their bleeding to the surface, to adjust the amount of the surfactant to improve the stability of coating, to increase the amount of the lubricant added in the non-magnetic layer to improve the lubricating effect, and the like. Further, all or a part of the additives used in the invention may be added in any step of the production of the coating solution for the magnetic layer or for the lower layer. For example, there are the case of mixing them with the ferromagnetic powder before a kneading step, the case of adding them in a kneading step of the ferromagnetic powder, the binder and the solvent, the case pf adding them in a dispersing step, the case of adding them after the dispersing step, the case of adding them just before coating, and the like.

The coating solution prepared from the above-mentioned materials is applied onto the non-magnetic support to form the non-magnetic layer or the magnetic layer.

Non-magnetic Support

As the non-magnetic support which can be used in the invention, there can be used known one such as biaxially oriented polyethylene naphthalate, polyethylene terephthalate, a polyamide, a polyimide, a polyamideimide, an aromatic polyamide, polybenzoxydazole or the like. Preferred are polyethylene naphthalate and an aromatic polyamide. These non-magnetic supports may previously be subjected to corona discharge treatment plasma treatment, treatment for making adhesion easy, heat treatment or the like. Further, it is preferred that the surface of the magnetic recording medium which can be used in the invention has such excellent smoothness that the surface center line average height is within the range from 0.1 to 20 nm, and preferably from 1 to 10 nm, at a cut-off value of 0.25 mm. It is further preferred that the support has not only a small surface center line average height, but also no large projections of 1 µm or more.

The value of the arithmetic average height (Ra) of the resulting support is preferably 0. 1 or less by "JIS B0660-1998, ISO 4287-1997", because the noise of the resulting magnetic recording medium is decreased. The thickness of the non-magnetic support in the magnetic recording medium of the invention is preferably from 3 to 80 µm.

Back Coat Layer, Undercoat Layer

For the non-magnetic support used in the invention, a surface not coated with the magnetic coating may be provided with a back coat layer (backing layer). The back coat layer is a layer provided by applying onto the surface not coated with the magnetic coating a coating for forming the back coat layer in which granular components such as an abrasive and a surfactant, and a binder are dispersed in an organic solvent. As the granular components, there can be used various kinds of inorganic pigments and carbon black; Further, as the binder, resins such as nitrocellulose, a phenoxy resin, a vinyl chloride-based resin and a polyurethane can be used either alone or as a mixture of them. For the non-magnetic support of the invention, a surface to be coated with the magnetic coating or the coating for forming the back coat layer may be provided with an adhesive layer.

Further, in the magnetic recording medium of the invention, an undercoat layer may be provided. The adhesive force between the support and the magnetic layer or the lower non-magnetic layer can be improved by providing the undercoat layer. As the undercoat layer, a solvent-soluble polyester resin is used. As the undercoat layer, there can be used, for example, one having a thickness of 0.5 µm or less.

EXAMPLES

The invention is concretely illustrated below based on examples. However, it is to be understood that the invention is limited to these examples. "Parts" given in the examples indicate "parts by weight", unless otherwise specified.

Synthesis of Binder

Synthesis Example PUA-1 (Synthesis of Polyurethane Resin PUA-1)

In a vessel equipped with a thermometer, a stirrer and a reflux condenser, in which the atmosphere was previously replaced with nitrogen, a polyether polyol and short chain diol having a cyclic structure of the composition shown in Table 1 were dissolved in a 30% solution of cyclohexanone in a stream of nitrogen at 60° C. Then, 60 ppm of dibutyltin dilaurate was added as a catalyst, and further dissolved for 15 minutes. Further, an organic diisocyanate compound shown in Table 1 was added, and allowed to react by heating for 6 hours to obtain polyurethane resin PUA-1. The hydrophilic polar group (—$SO_3Na$) content of the resulting polyurethane resin PUA-1 was 0.287 meq/g.

Synthesis Examples PUA-2, PUa-3, PUC-1 and PUc-2 (Synthesis of Polyurethane Resins PUA-2, PUa-3, PUC-1 and PUc-2)

Polyurethane resins PUA-2, PUa-3, PUC-1 and PUc-2 were obtained using a chain extender and organic diisocyanate compound shown in Table 1 in the same manner as with Synthesis Example PUA-1. The hydrophilic polar group (—$SO_3Na$) contents of the resulting polyurethane resins PUA-2, PUa-3, PUC-1 and PUc-2 are shown in Table 1.

Synthesis Example PUB-1 (Synthesis of Polyurethane Resin PUB-1)

(1) Synthesis of Polyester Polyol A

In a reaction vessel equipped with a thermometer, a stirrer and a reflux condenser, 365 parts of-adipic acid and 260 parts of neopentyl glycol were placed, and 2% by weight of zinc acetate and 3% by weight of sodium acetate were placed therein as a catalyst. Transesterification was conducted at 180° C. to 220° C. for 3 hours, and polycondensation was conducted at 220° C. to 280° C. under a reduced pressure of 1 to 10 mmHg for 2 hours. Thus, polyester polyol A was obtained.

(2) Synthesis of Polyurethane Resin PUB-1

Then, using the polyester polyol obtained above, polyurethane resin PUB-1 was obtained using a chain extender and organic diisocyanate compound shown in Table 1 in the same manner as with Synthesis Example PUA-1. The hydrophilic polar group (—$SO_3Na$) content of the resulting polyurethane resin PUB-1 was 0.339 meq/g.

Synthesis Examples PUB-2, PUB-3 and PUb-4 (Synthesis of Polyurethane Resins PUB-2, PUB-3 and PUb-4)

Polyurethane resins PUB-2, PUB-3 and PUb-4 were obtained using a chain extender and organic diisocyanate compound shown in Table 1 in the same manner as with Synthesis Example PUB-1. The hydrophilic polar group (—$SO_3Na$) contents of the resulting polyurethane resins PUB-2, PUB-3 and PUb-4 are shown in Table 1.

Synthesis Example PVC-1 (Synthesis of Vinyl Chloride-based Resin PVC-1)

In a polymerization reaction vessel, 130 parts of deionized water, 117 parts of methanol, 0.6 part of methyl cellulose, 0.2 part of a polyoxyethylene sorbitan fatty acid partial ester and 0.52 part of trichloroethylene were placed, and the atmosphere in the system was degassed under reduced pressure. Then, a vinyl chloride monomer, glycidyl allyl ether and 2-hydroxypropyl methacrylate shown in Table 2 were placed therein, and stirred with 60#C. Thereafter, 0.42 part of 3,3,5-trimethylhexanoyl peroxide was placed therein, and polymerization was initiated. At the same time, 8 parts of sodium p-styrenesulfonate dissolved in 40 parts of methanol was continuously fed at a constant rate so that the total amount was consumed for 8 hours. After a reaction time of 12 hours, cooling was conducted at the time when the pressure of the polymerization reaction vessel reached 3 kg/cm$^2$ to obtain vinyl chloride-based resin PVC-1. The hydrophilic polar group (—SO$_3$Na) content of the resulting vinyl chloride-based resin PVC-1 was 0.336 meq/g.

Synthesis Examples PVC-2 and PVc-3 (Synthesis of Vinyl Chloride-based Resins PVC-2 and PVc-3)

Vinyl chloride-based resins PVC-2 and PVc-3 were obtained in the same manner as with Synthesis example PVC-1, using a vinyl chloride monomer and other radical polymerizable monomer units shown in Table 2. The hydrophilic polar group (—SO$_3$Na) contents of the resulting vinyl chloride-based resins PVC-2 and PVc-3 are shown in Table 2.

Synthesis Example AC-1 (Synthesis of Acrylic Resin AC-1)

After the atmosphere in a polymerization vessel equipped with a stirrer, a thermometer, a condenser and a nitrogen gas inlet was replaced with nitrogen, the temperature thereof was elevated to 60° C. Then, a solution in which benzyl methacrylate, diacetoneacrylamide and 2-hydroxyethyl methacrylate were dissolved in 100 parts of cyclohexanone and a solution in which 0.5 part of 2,2'-azobisisobutyronitrile was dissolved in 10 parts of cyclohexanone were concurrently homogeneously added dropwise into the above-mentioned polymerization vessel, taking 2 hours. After the termination of dropping, heating was further continued at 60° C. for 4 hours to complete the polymerization, thereby obtaining acrylic resin AC-1. The hydrophilic polar group (amido group) content was 0.50 meq/g.

Synthesis Examples AC-2 to 7, Ac-8, AC-9 and 10 (Synthesis of Acrylic Resins AC-2 to 7, Ac-8, AC-9 and 10)

Acrylic resins AC-2 to 7, Ac-8, AC-9 and 10 were obtained by conducting copolymerization in the same manner as with Synthesis Example AC-1 according to the kind and amount ratio (parts by weight) of monomer shown in Table 3, and conducting a reaction by a similar method. The hydrophilic polar group (—SO$_3$Na, amido group, amino group, PO(OH)$_2$, COONA) contents of the resulting acrylic resins AC-2 to 7, Ac-8, AC-9 and 10 are shown in Table 3.

TABLE 1

| Composition (parts by weight) | | PUA-1 | PUA-2 | PUa-3 | PUB-1 | PUB-2 | PUB-3 | PUb-4 | PUC-1 | PUc-2 |
|---|---|---|---|---|---|---|---|---|---|---|
| Polyol | Polyether A | 40.0 | | 40.0 | | | | | | |
| | Polyether B | | 40.0 | | | | | | | |
| | Polyester A | | | | 45.0 | 45.0 | 45.0 | 45.0 | | |
| | Dimer Diol | | | | | | | | 15.0 | 15.0 |
| Chain Extender | HBpA | 22.0 | 22.0 | 22.0 | | | | | 35.0 | 35.0 |
| | 2-Ethyl-2-butyl-1,3-propanediol | | | | 10.0 | 10.0 | | 10.0 | | |
| | 1,6-hexanediol | | | | | | 6.8 | | | |
| Polar Group-Containing Diol | DEIS | 12.0 | 12.0 | 2.0 | 12.0 | 20.0 | 12.0 | 2.0 | 12.0 | 2.0 |
| Organic Diisocyanate | MDI | 43.5 | 39.4 | 32.7 | 32.4 | 37.8 | 32.4 | 25.7 | 54.1 | 46.7 |
| Hydrophilic Polar Group | —SO$_3$Na-Introduced Amount (meq/g) | 0.287 | 0.297 | 0.058 | 0.339 | 0.498 | 0.350 | 0.068 | 0.290 | 0.057 |
| Number Average Molecular Weight | | 42000 | 28000 | 42000 | 45000 | 62000 | 38000 | 53000 | 48000 | 32000 |

HBpA: Hydrogenated bisphenol A
Polyether A: A polypropylene oxide addition product of bisphenol A
Polyether B: Polypropylene oxide (molecular weight: 1000)
Polyester A: Adipic acid/neopentyl glycol = 73/52 (molecular weight: 1000)
DEIS: An ethylene oxide addition product of sulfoisophthalic acid
MDI: 4,4'-Diphenylmethane diisocyanate

TABLE 2

| Composition of Monomer | Synthesis Example No. | | |
|---|---|---|---|
| Unit (parts by weight) | PVC-1 | PVC-2 | PVc-3 |
| Vinyl Chloride Monomer | 85.0 | 85.0 | 85.0 |
| Other Radically Polymerizable Monomers | | | |
| Glycidyl Allyl Ether | 10.0 | 10.0 | 10.0 |
| 2-Hydroxypropyl Methacrylate | 5.0 | 5.0 | 5.0 |
| Sodium p-Styrenesulfonate | 8.0 | 6.0 | 3.0 |
| Hydrophilic Polar Group | | | |
| —SO$_3$Na-Introduced Amount (meq/g) | 0.336 | 0.247 | 0.127 |
| Number Average Molecular Weight | 43000 | 38000 | 41000 |

TABLE 3

Composition (% by Weight) and Molecular Weight of Acrylic Resin Monomer Unit

| | Monomer | Molecular Weight | AC-1 | AC-2 | AC-3 | AC-4 | AC-5 | AC-6 | AC-7 | Ac-8 | AC-9 | AC-10 |
|---|---|---|---|---|---|---|---|---|---|---|---|---|
| Aromatic Group-Containing (Meth)acrylate Unit | Benzyl Methacrylate | 176 | 70.00 | 50.00 | 50.00 | 50.00 | 30.00 | 0.00 | 0.00 | 0.00 | 50.00 | 50.00 |
| | Benzyl Acrylate | 162 | 0.00 | 0.00 | 0.00 | 0.00 | 0.00 | 70.00 | 0.00 | 0.00 | 0.00 | 0.00 |
| Nitrogen-Containing Radically Polymerizable Unit | N,N-Dimethylaminopropylacrylamide | 184 | 0.00 | 0.00 | 29.44 | 0.00 | 46.00 | 0.00 | 0.00 | 0.00 | 0.00 | 0.00 |
| | N,N-Isopropylacrylamide | 127 | 0.00 | 0.00 | 0.00 | 27.3 | 0.00 | 0.00 | 0.00 | 0.00 | 31.75 | 31.75 |
| | Diacetoneacrylamide | 169 | 8.45 | 0.00 | 0.00 | 0.00 | 0.00 | 0.00 | 0.00 | 1.69 | 0.00 | 0.00 |
| | N-Vinylpyrrolidone | 111 | 0.00 | 25.53 | 0.00 | 0.00 | 0.00 | 0.00 | 0.00 | 0.00 | 0.00 | 0.00 |
| Others | Methyl Methacrylate | 100 | 16.55 | 14.61 | 15.56 | 17.70 | 19.00 | 7.99 | 90.88 | 91.25 | 7.43 | 10.55 |
| | 2-Hydroxymethyl Methacrylate | 130 | 5.00 | 5.00 | 5.00 | 5.00 | 5.00 | 5.00 | 5.00 | 5.00 | 5.00 | 5.00 |
| | Sodium p-Styrenesulfonate | 206 | 0.00 | 0.00 | 0.00 | 0.00 | 0.00 | 0.00 | 4.12 | 2.06 | 0.00 | 0.00 |
| | Sodium Acrylamido-2-methylpropanesulfonate | 243 194 | 0.00 | 4.86 | 0.00 | 0.00 | 0.00 | 17.01 | 4.86 | 0.00 | 0.00 | 0.00 |
| | Phosphoethyl Methacrylate | 108 | 0.00 | 0.00 | 0.00 | 0.00 | 0.00 | 0.00 | 0.00 | 0.00 | 5.82 | 0.00 |
| | Sodium Methacrylate | | 0.00 | 0.00 | 0.00 | 0.00 | 0.00 | 0.00 | 0.00 | 0.00 | 0.00 | 2.70 |
| Polar Group | Amino Group Amount (Meq/g) | | 0.00 | 0.00 | 1.60 | 2.15 | 2.50 | 0.00 | 0.00 | 0.00 | 0.00 | 0.00 |
| | Amido Group Amount (Meq/g) | | 0.50 | 2.50 | 1.60 | 2.15 | 2.50 | 0.70 | 0.00 | 0.10 | 2.50 | 2.50 |
| | Total Amount of Amino Group and Amido Group (meq/g) | | 0.50 | 2.50 | 3.20 | 4.30 | 5.00 | 0.70 | 0.00 | 0.00 | 2.50 | 2.50 |
| | $SO_3Na$ Group Amount (meq/g) | | 0.00 | 0.20 | 0.00 | 0.00 | 0.00 | 0.70 | 0.20 | 0.10 | 0.00 | 0.00 |
| | $PO(OH)_2$ Group Amount (meq/g) | | 0.00 | 0.00 | 0.00 | 0.00 | 0.00 | 0.00 | 0.00 | 0.00 | 0.30 | 0.00 |
| | COONa Group Amount (meq/g) | | 0.00 | 0.00 | 0.00 | 0.00 | 0.00 | 0.00 | 0.00 | 0.00 | 0.00 | 0.25 |
| Number Average Molecular Weight | | | 96000 | 73000 | 125000 | 89000 | 12500 | 125000 | 123000 | 110000 | 148000 | 73000 |

Synthesis of Magnetic Recording Medium Sample

Sample 1 (Comparison)

For each of the following magnetic coating A and non-magnetic coating a, respective components were kneaded with a kneader, and then, dispersed by use of a sand mill. A polyisocyanate was added to the resulting solution A and non-magnetic coating in an amount of 13 parts for the coating solution for the non-magnetic layer, and in an amount of 4 parts for the coating solution of magnetic coating A. Further, 30 parts of cyclohexanone was added to each, followed by filtration with a filter having an average pore size of 1 µm to prepare coating solutions for formation of the non-magnetic layer and for formation of the magnetic layer, respectively.

The resulting non-magnetic layer coating solution was applied onto a 62-µm thick polyethylene terephthalate support having a surface center plane average height of 3 nm so as to give a thickness of 1.5 µm after drying. After drying, the magnetic layer was formed in multiple layers so as to give a thickness of 0.1 µm. After drying, treatment was conducted with a 7-step calender at a temperature of 90° C. at a line pressure of 300 kg/cm. The resulting product was stamped to 3.7 inches and subjected to surface grinding treatment.

Sample 2 (Comparison)

Sample 2 was prepared in the same manner as with Sample 1 with the exception that the ferromagnetic hexagonal ferrite powder of magnetic coating A was humidified to change the water content to 1.0%.

Sample 3 (Invention)

Sample 3 was prepared in the same manner as with Sample 2 with the exception that magnetic coating A was changed to magnetic coating B, and non-magnetic coating a was changed to non-magnetic coating b.

Samples 4 and 5, 16 to 20, 23 and 26 to 37

Samples 4 and 5, 16 to 20, 23 and 26 to 37 were prepared in the same manner as with Sample 3 with the exception that the binder added to the magnetic coating and the non-magnetic coating was changed as shown in Tables 4 and 5. Samples 5, 18, 20, 32 and 37 are comparative samples, and the rest are samples of the invention.

Samples 6 to 15

Samples 6 to 15 were prepared in the same manner as with Sample 3 with the exception that the average particle size and water content of the hexagonal barium ferrite added to the magnetic coating were changed as shown in Table 4. Samples 6, 11, 12 and 15 are comparative samples, and the rest are samples of the invention.

Samples 21 (Comparison), 22 (Invention), 24 (Invention) and 25 (Invention)

Samples 21, 22, 24 and 25 were prepared in the same manner as with Sample 23 with the exception that the average particle size and water content of the hexagonal barium ferrite added to the magnetic coating were changed as shown in Table 5.

Sample 38 (Invention)

Sample 38 was prepared in the same manner as with Sample 2 with the exception that magnetic coating A was changed to magnetic coating B.

Samples 39 and 40 (Invention)

Samples 39 and 40 were prepared in the same manner as with Sample 8 with the exception that the binder of the non-magnetic coating was changed as shown in Table 5.

| (Magnetic Coating A) | |
| --- | --- |
| Hexagonal Barium Ferrite | 100 parts |
| Surface Treatment: | |
| Al$_2$O$_3$; 5% by weight | |
| SiO$_2$; 2% by weight | |
| Hc: 2500 Oe | |
| Tabular diameter: 30 nm | |
| Tabular Ratio: 3 | |
| σs: 56 emu/g | |
| Vinyl Chloride Copolymer | 7 parts |
| MR-110 (manufactured by Nippon Zeon Co., Ltd.) | |
| Polyurethane Resin | 3 parts |
| UR 8200 (manufactured by Toyobo Co., Ltd.) | |
| α-Alumina | 4 parts |
| HIT-60 (manufactured by Sumitomo Chemical Co., Ltd.) | |
| Diamond (average particle size: 100 nm) | 2 parts |
| Carbon Black | 1 part |
| #50 (manufactured by Asahi Carbon Co.) | |
| Isocetyl Stearate | 5 parts |
| Stearic Acid | 1 part |
| Oleic Acid | 1 part |
| Methyl Ethyl Ketone | 80 parts |
| Cyclohexanone | 120 parts |

| (Magnetic Coating B) | |
| --- | --- |
| Hexagonal Barium Ferrite | 100 parts |
| Surface Treatment: | |
| Al$_2$O$_3$; 5% by weight | |
| SiO$_2$; 2% by weight | |
| Hc: 2500 Oe | |
| Tabular diameter: 30 nm | |
| Tabular Ratio: 3 | |
| σs: 56 emu/g | |
| Polyurethane Resin PUA-1 | 10 parts |
| α-Alumina | 4 parts |
| HIT-60 (manufactured by Sumitomo Chemical Co., Ltd.) | |
| Diamond (average particle size: 100 nm) | 2 parts |
| Carbon Black | 1 part |
| #50 (manufactured by Asahi Carbon Co.) | |
| Isocetyl Stearate | 5 parts |
| Stearic Acid | 1 part |
| Oleic Acid | 1 part |
| Methyl Ethyl Ketone | 80 parts |
| Cyclohexanone | 120 parts |

| (Non-Magnetic Coating a) | |
| --- | --- |
| α-Fe$_2$O$_3$ Hematite | 100 parts |
| Average length in the long axis: 0.07 μm | |
| Average length in the short axis: 0.014 μm | |
| Specific surface area measured by the BET Method: | |
| 55 m$^2$/g | |
| pH: 9 | |
| Surface treating agent: Al$_2$O$_3$, 8% by weight | |
| Carbon Black (average particle size: 20 nm) | 25 parts |
| CONDUCTEX SC-U (manufactured by Colombia Carbon) | |
| Vinyl Chloride Copolymer | 15 parts |
| MR-104 (manufactured by Nippon Zeon Co., Ltd.) | |
| Polyurethane Resin | 7 parts |
| UR5500 (manufactured by Toyobo Co., Ltd.) | |
| Phenylphosphonic Acid | 4 parts |
| Isocetyl Stearate | 6 parts |
| Oleic Acid | 1 part |
| Stearic Acid | 1 part |
| Methyl Ethyl Ketone/Cyclohexanone (8/2 Mixed Solvent) | 250 parts |

| (Non-Magnetic Coating b) | |
| --- | --- |
| α-Fe$_2$O$_3$ Hematite | 100 parts |
| Average length in the long axis: 0.07 μm | |
| Average length in the short axis: 0.014 μm | |
| Specific surface area measured by the BET method: | |
| 55 m$^2$/g | |
| pH: 9 | |
| Surface treating agent: Al$_2$O$_3$, 8% by weight | |
| Carbon Black | 25 parts |
| CONDUCTEX SC-U (manufactured by Colombia Carbon) | |
| Polyurethane Resin PUA-1 | 22 parts |
| Phenylphosphonic Acid | 4 parts |
| Isocetyl Stearate | 6 parts |
| Oleic Acid | 1.3 parts |
| Stearic Acid | 1.3 parts |
| Methyl Ethyl Ketone/Cyclohexanone (8/2 Mixed Solvent) | 250 parts |

For samples 1 to 40 of the magnetic recording media prepared above, (1) the measurement of S/N and (2) the measurement of thermal asperity were made by the following methods. Results are shown in Tables 4 and 5.

(1) Measurement of S/N

With an RWA 1001 type disk evaluation apparatus manufactured by GUZIK, U.S.A. and Spinstand LS-90 manufactured by Kyodo Denshi System Co., Ltd., a signal having a line recording density of 100 KFCI was written at a position of 24.6 mm in the radial direction using a metal-in-gap head having a track width of 5 μm and a gap length of 0.2 μm, and reproduced using an MR head having a track width of 2.6 μm. The reproduction output (TAA) thereof and the noise level after DC erase were measured to determine the S/N value.

(2) Measurement of Thermal Asperity

With an RWA 1001 type disk evaluation apparatus manufactured by GUZIK, U.S.A. and Spinst and LS-90 manufactured by Kyodo Denshi System Co., Ltd., a signal having a line recording density of 100 KFCI was written at a position of 24.6 mm in the radial direction using a metal-in-gap head having a track width of 5 μm and a gap length of 0.2 μm, and reproduced using an MR head having a track width of 2.6 μm. Fluctuations of 3 dB or more in the noise level were counted as thermal asperity to determine the frequency of occurrence per track.

TABLE 4

| | Magnetic Substance Average tabular diameter (nm) | Water Content (%) | Binder Magnetic Layer | Binder Non-Magnetic Layer | S/N (dB) | Thermal Asperity (frequency) |
|---|---|---|---|---|---|---|
| 1 (Comparison) | 30 | 0.2 | MR110+UR8200 | MR104+UR8200 | 18 | 40 |
| 2 (Comparison) | 30 | 1.0 | MR110+UR8200 | MR104+UR8200 | 12 | 30 |
| 3 (Invention) | 30 | 1.0 | PUA-1 | PUA-1 | 28 | 3 |
| 4 (invention) | 30 | 1.0 | PUA-2 | PUA-2 | 28 | 2 |
| 5 (Comparison) | 30 | 1.0 | PUa-3 | PUa-3 | 20 | 30 |
| 6 (Comparison) | 30 | 0.1 | PUB-1 | PUB-1 | 20 | 25 |
| 7 (Invention) | 30 | 0.3 | PUB-1 | PUB-1 | 26 | 2 |
| 8 (Invention) | 30 | 1.0 | PUB-1 | PUB-1 | 28 | 3 |
| 9 (Invention) | 30 | 2.0 | PUB-1 | PUB-1 | 26 | 1 |
| 10 (Invention) | 30 | 3.0 | PUB-1 | PUB-1 | 24 | 2 |
| 11 (Comparison) | 30 | 4.0 | PUB-1 | PUB-1 | 18 | 20 |
| 12 (Comparison) | 5 | 1.0 | PUB-1 | PUB-1 | 18 | 5 |
| 13 (Invention) | 10 | 1.0 | PUB-1 | PUB-1 | 26 | 2 |
| 14 (Invention) | 40 | 1.0 | PUB-1 | PUB-1 | 26 | 3 |
| 15 (Comparison) | 50 | 1.0 | PUB-1 | PUB-1 | 20 | 4 |
| 16 (Invention) | 30 | 1.0 | PUB-2 | PUB-2 | 29 | 2 |
| 17 (Invention) | 30 | 1.0 | PUB-3 | PUB-3 | 28 | 3 |
| 18 (Comparison) | 30 | 1.0 | PUb-4 | PUb-4 | 20 | 30 |
| 19 (Invention) | 30 | 1.0 | PUC-1 | PUC-1 | 25 | 3 |
| 20 (Comparison) | 30 | 1.0 | PUc-2 | PUc-2 | 20 | 25 |

TABLE 5

| | Magnetic Substance Average tabular diameter (nm) | Water Content (%) | Binder Magnetic Layer | Binder Non-Magnetic Layer | S/N (dB) | Thermal Asperity (frequency) |
|---|---|---|---|---|---|---|
| 21 (Comparison) | 30 | 0.1 | AC-1 | AC-1 | 18 | 30 |
| 22 (Invention) | 30 | 0.3 | AC-1 | AC-1 | 24 | 3 |
| 23 (Invention) | 30 | 1.0 | AC-1 | AC-1 | 26 | 2 |
| 24 (invention) | 30 | 3.0 | AC-1 | AC-1 | 24 | 3 |
| 25 (Comparison) | 30 | 4.0 | AC-1 | AC-1 | 18 | 20 |
| 26 (Invention) | 30 | 1.0 | AC-2 | AC-2 | 28 | 3 |
| 27 (Invention) | 30 | 1.0 | AC-3 | AC-3 | 28 | 4 |
| 28 (Invention) | 30 | 1.0 | AC-4 | AC-4 | 29 | 2 |
| 29 (Invention) | 30 | 1.0 | AC-5 | AC-5 | 27 | 4 |
| 30 (Invention) | 30 | 1.0 | AC-6 | AC-6 | 24 | 2 |
| 31 (Invention) | 30 | 1.0 | AC-7 | AC-7 | 24 | 1 |
| 32 (Comparison) | 30 | 1.0 | Ac-8 | Ac-8 | 18 | 25 |
| 33 (Invention) | 30 | 1.0 | AC-9 | AC-9 | 26 | 3 |
| 34 (Invention) | 30 | 1.0 | AC-10 | AC-10 | 26 | 3 |
| 35 (Invention) | 30 | 1.0 | PVC-1 | PVC-1 | 26 | 2 |
| 36 (Invention) | 30 | 1.0 | PVC-2 | PVC-2 | 24 | 3 |
| 37 (Comparison) | 30 | 1.0 | PVc-3 | PVc-3 | 18 | 30 |
| 38 (Invention) | 30 | 1.0 | PUB-1 | MR104+UR8200 | 26 | 2 |
| 39 (Invention) | 30 | 1.0 | PUB-1 | PUC-1 | 26 | 3 |
| 40 (Invention) | 30 | 1.0 | PUB-1 | AC-1 | 26 | 1 |

The results shown in Tables 4 and 5 reveal that the samples of the magnetic recording media according to the invention are excellent in the S/N characteristic, and decreased in the occurrence of thermal asperity.

On the other hand, the results reveal that the comparative samples in which the polar groups of the binders and the average tabular diameter and water content of the magnetic substances are outside the ranges of the invention are poor in at least either of the S/N characteristic and the occurrence of thermal asperity.

In the magnetic recording medium obtained by the production method of the invention, the suitable selection of the water content of the magnetic substance and the amount of the hydrophilic polar group of the binder has increased the amount of the binder adsorbed by the magnetic substance to substantially improve dispersibility. As a result, the media noise is decreased, and the minute projections contributing to thermal asperity are also be reduced, so that substantial improvement in recording density is achieved in combination with the MR head.

That is to say, the magnetic recording medium obtained by the production method of the invention has the excellent S/N characteristic and is decreased in the occurrence of thermal asperity. It is therefor suitable as a medium for high density recording.

This application is based on Japanese Patent application JP 2001-330575, filed October 29, 2001, the entire content of which is hereby incorporated by reference, the same as if set forth at length.

What is claimed is:

1. A method for producing a magnetic recording medium comprising:

dispersing at least a binder and a ferromagnetic hexagonal ferrite powder to prepare a magnetic coating; and applying the magnetic coating to provide at least one magnetic layer, wherein the binder is at least one of:

(a) a binder comprising 0.2 to 0.7 meq/g of at least one polar group selected from $-SO_3M$, $-OSO_3M$, $-PO(OM)_2$, $-OPO(OM)_2$ and $-COOM$ wherein M represents a hydrogen atom, an alkali metal or ammonium; and (b) a binder comprising 0.5 to 5 meq/g of at least one polar group selected from $-CONR_1R_2$, $-NR_1R_2$ and $-N^+R_1R_2R_3$ wherein $R_1$, $R_2$ and $R_3$ each independently represents a hydrogen atom or an alkyl group, and the ferromagnetic hexagonal ferrite powder has an average tabular diameter of from 10 to 40 nm and a water content of from 0.3 to 3% by weight.

2. The method according to claim 1, wherein the binder is a polyurethane resin obtained by reacting: a polyol having a cyclic structure and an alkylene oxide chain and having a molecular weight of from 500 to 5000; a polyol having a cyclic structure and having a molecular weight of from 200 to 500 as a chain extender; and an organic diisocyanate.

3. A magnetic recording medium which is produced by the method according to claim 2.

4. The method according to claim 1, wherein the binder is a polyurethane resin obtained by reacting: a polyol compound having a cyclic structure and an alkyl chain having 2 or more carbon atoms; and an organic diisocyanate.

5. A magnetic recording medium which is produced by the method according to claim 4.

6. The method according to claim 1, wherein the binder is an acrylic copolymer comprising 1% by weight to 75% by weight of nitrogen-containing radically polymerizable monomer units, 1% by weight to 75% by weight of aromatic ring-containing radically polymerizable monomer units and other radically polymerizable monomer units so as to give the total amount of 100% by weight.

7. A magnetic recording medium which is produced by the method according to claim 6.

8. The method according to claim 1, wherein the binder is a polyurethane resin obtained by reacting: a polyester polyol comprising an aliphatic dibasic acid and an aliphatic diol having an alkyl branched side chain and no cyclic structure; an aliphatic diol having a branched alkyl side chain and 3 or more carbon atoms as a chain extender; and an organic diisocyanate.

9. A magnetic recording medium which is produced by the method according to claim 8.

10. The method according to claim 1, wherein the binder is a vinyl chloride-based copolymer comprising at least 75% by weight to 95% by weight of vinyl chloride monomer units.

11. A magnetic recording medium which is produced by the method according to claim 10.

12. A magnetic recording medium which is produced by the method according to claim 1.

13. The magnetic recording medium according to claim 12, which is for MR head reproduction.

* * * * *